US009690620B2

(12) United States Patent
Mitra et al.

(10) Patent No.: US 9,690,620 B2
(45) Date of Patent: Jun. 27, 2017

(54) POLYMORPHIC HETEROGENEOUS MULTI-CORE ARCHITECTURE

(71) Applicant: National University of Singapore, Singapore (SG)

(72) Inventors: Tulika Mitra, Singapore (SG); Mihai Pricopi, Singapore (SG)

(73) Assignee: National University of Singapore, Singapore (SG)

( * ) Notice: Subject to any disclaimer, the term of this patent is extended or adjusted under 35 U.S.C. 154(b) by 259 days.

(21) Appl. No.: 14/360,263

(22) PCT Filed: Dec. 3, 2012

(86) PCT No.: PCT/SG2012/000454
§ 371 (c)(1),
(2) Date: May 22, 2014

(87) PCT Pub. No.: WO2013/081556
PCT Pub. Date: Jun. 6, 2013

(65) Prior Publication Data
US 2014/0331236 A1 Nov. 6, 2014

Related U.S. Application Data

(60) Provisional application No. 61/565,559, filed on Dec. 1, 2011.

(51) Int. Cl.
*G06F 9/30* (2006.01)
*G06F 9/46* (2006.01)
(Continued)

(52) U.S. Cl.
CPC .......... *G06F 9/4881* (2013.01); *G06F 9/3009* (2013.01); *G06F 9/30145* (2013.01);
(Continued)

(58) Field of Classification Search
CPC .. G06F 9/4881; G06F 9/3009; G06F 9/30145; G06F 9/384; G06F 9/3851;
(Continued)

(56) References Cited

U.S. PATENT DOCUMENTS

| 7,398,374 B2 * | 7/2008 | DeLano | G06F 9/3828 712/206 |
| 7,673,295 B1 * | 3/2010 | Lin | G06F 8/445 717/119 |

(Continued)

OTHER PUBLICATIONS

Lo J. et al., Converting Thread-Level Parallelism to Instruction-Level Parallelism via Simultaneous Multithreading, ACM Transactions on Computer Systems, vol. 15, No. 3, Aug. 1997, pp. 322-354.
Becchi M. et al., Dynamic Thread Assignment on Heterogeneous Multiprocessor Architectures, Journal of Instruction-Level Parallelism, vol. 10, Jun. 2008, 26 pages.
Pricopi M et al., Bahurupi: A Polymorphic Heterogeneous Multi-Core Architecture, ACM Transactions on Architecture and Code Optimization, vol. 8, No. 4, Article 22, Jan. 2012, 20 pages.
International Search Report dated Feb. 1, 2013, from related PCT Patent Application No. PCT/SG2012/000454, 4 pages.

*Primary Examiner* — Daniel Pan
(74) *Attorney, Agent, or Firm* — Hovey Williams LLP

(57) ABSTRACT

Methods and architecture for dynamic polymorphic heterogeneous multi-core processor operation are provided. The method for dynamic heterogeneous polymorphic processing includes the steps of receiving a processing task comprising a plurality of serial threads. The method is performed in a processor including a plurality of processing cores, each of the plurality of processing cores being assigned to one of a plurality of core clusters and each of the plurality of core clusters capable of dynamically forming a coalition comprising two or more of its processing cores. The method further includes determining whether each of the plurality of serial threads requires more than one processing core, and sending a go-into-coalition-mode-now instruction to ones of the plurality of core clusters for handling ones of the plurality of serial threads that require more than one processing core.

14 Claims, 19 Drawing Sheets

(51) Int. Cl.
*G06F 15/76* (2006.01)
*G06F 9/48* (2006.01)
*G06F 15/78* (2006.01)
*G06F 9/38* (2006.01)
*G06F 9/50* (2006.01)

(52) U.S. Cl.
CPC ............ *G06F 9/384* (2013.01); *G06F 9/3826* (2013.01); *G06F 9/3828* (2013.01); *G06F 9/3836* (2013.01); *G06F 9/3853* (2013.01); *G06F 9/3891* (2013.01); *G06F 9/5061* (2013.01); *G06F 15/7867* (2013.01); *G06F 9/505* (2013.01); *G06F 2209/5012* (2013.01)

(58) Field of Classification Search
CPC .. G06F 9/3891; G06F 9/5061; G06F 15/7867; G06F 2209/50126; G06F 9/3826; G06F 9/3828; G06F 9/3836; G06F 9/3853; G06F 9/505; G06F 2209/5012
USPC ............................ 712/43, 229; 718/102, 105
See application file for complete search history.

(56) References Cited

U.S. PATENT DOCUMENTS

| | | | |
|---|---|---|---|
| 2008/0229220 A1* | 9/2008 | Jing | G06F 8/34 715/763 |
| 2008/0303841 A1* | 12/2008 | Newhall, Jr. | G06T 1/60 345/587 |
| 2009/0328047 A1 | 12/2009 | Li et al. | |
| 2010/0058346 A1* | 3/2010 | Narang | G06F 9/5066 718/102 |
| 2011/0040772 A1* | 2/2011 | Sheu | G06F 17/30427 707/755 |

\* cited by examiner

POLYMORPHIC HETEROGENEOUS MULTI-CORE ARCHITECTURE

RELATED APPLICATIONS

This application is a national stage application, under 35 U.S.C. §371 of International Patent Application No. PCT/SG2012/000454, filed on Dec. 3, 2012 and published as WO 2013/081556 on Jun. 6, 2013, which claims priority to U.S. Provisional Application No. 61/565,559, filed on Dec. 1, 2011, which is hereby incorporated by reference in its entirety.

FIELD OF THE INVENTION

The present invention generally relates to semiconductor processors having multiple cores, and more particularly relates to methods and architecture for dynamic polymorphic heterogeneous multi-core processor operation.

BACKGROUND OF THE DISCLOSURE

Current evolution of technology nodes drives the critical dimensions in semiconductor devices smaller and smaller. However, mere reduction in the critical dimensions and transistor sizes no longer provides corresponding improvements in power, performance and silicon area. With shrinking transistor size and computer processor multi-core architectures more operations can be performed in silicon. In particular, multi-core architectures provide parallel processing capability for processing speed-up. However, power constraints arising from the afore-mentioned lack of corresponding improvements in power usage and power limitations in, for example, mobile devices prevent powering all of the circuitry at the same time. This is especially true in computer processors having multi-core architectures.

Homogeneous core architectures having a plurality of simple cores are ideal for applications with high thread-level parallelism, yet suffer from a lack of instruction-level parallelism support due to large sequential fractions in handling complex applications. Multi-core architecture can be designed for high-performance handling of specific applications (e.g., graphics processors) but are not adaptable enough to handle other operations.

Computer processors, however, are being required to do more, even in mobile devices with limited power. For example, a Smartphone today is expected to support a very dynamic and diverse landscape of software applications. This is driving the distinction between high-performance embedded architecture and general purpose computing architecture to rapidly disappear, especially in the consumer electronics domain. Traditional homogeneous multi-core architecture having a collection of identical simple cores is not suitable for today's workload. On the other hand, embedded systems having heterogeneous multi-core solutions are customized for a particular application domain offering significant advantage in terms of performance, power, and silicon area, yet lack the adaptability to execute the variety of applications in today's workload such as the wide variety of general-purpose applications for which the workload is not known a-priori.

Some previously proposed architectures have attempted to adapt multi-cores to speed up sequential applications. An asymmetric chip multiprocessor that comprises of cores with different size and performance was proposed. The advantage of this architecture is low power consumption and high performance achieved by dynamically moving programs from one core to another in order to reach an optimal point. However, this architecture lacks flexibility and introduces a high degree of unpredictability for software applications. Another conventional architecture fuses homogeneous cores to improve single-thread performance, yet requires complex distributed hardware leading to higher performance overhead. Another approach merges a pair of scalar cores to create 2-way out-of-order cores by modifying internal pipeline stages. However, conjoining in-order processors to form complex out-of-order cores introduces fundamental obstacles limiting achievable performance and does not increase performance because the cores do not have minimal out-of-order capabilities In yet another multi-core architecture proposal, multiple homogeneous cores can be adapted for single and multi-threaded applications, yet rely on a very complex compiler that exploits parallelism from serial code by partitioning the code into small threads, scheduling the instruction to the cores and directing the communication among the cores. In one proposed asymmetric chip multiprocessor alternative, the serialization effect of a critical section for multithreaded application suffers from threads which do not finish their jobs at the same time resulting in synchronization mechanisms that require a considerable number of fast threads waiting for the slow threads to complete. And yet another proposal improves task-level parallelism by executing dynamically forked tasks in an out-of-order fashion with cores behaving as functional units. Disadvantageously, the dependency information between tasks is explicitly defined by the programmer in a special programming model and complex hardware is required to handle decoding, building task-graph and scheduling tasks to the cores.

Thus, what is needed is a plurality of simple cores in a reconfigurable multi-core architecture that can dynamically adapt itself to support both multi-threaded code with explicit thread-level parallelism as well as sequential code with instruction-level parallelism. Furthermore, other desirable features and characteristics will become apparent from the subsequent detailed description and the appended claims, taken in conjunction with the accompanying drawings and this background of the disclosure.

SUMMARY

According to the Detailed Description, a method for dynamic heterogeneous polymorphic processing in a processor including a plurality of processing cores is presented. Each of the plurality of processing cores is assigned to one of a plurality of core clusters and each of the plurality of core clusters is capable of dynamically forming a coalition comprising two or more of its processing cores. The method includes the steps of receiving a processing task comprising a plurality of serial threads and dividing each of the plurality of serial threads into a plurality of basic blocks, each of the plurality of basic blocks comprising a single entry point and a single exit point. The method also includes creating a control flow graph for the plurality of basic blocks, determining whether each of the plurality of serial threads requires more than one processing core, and sending a go-into-coalition-mode-now instruction to ones of the plurality of core clusters for handling ones of the plurality of serial threads that require more than one processing core. Further, the method includes the step of adding one of a plurality of sentinel instructions to each of the plurality of basic blocks of the ones of the plurality of serial threads that require more than one processing core, each of the plurality of sentinel instructions comprising information for processing of the plurality of basic blocks. And finally, the method includes sending a go-out-of-coalition-mode-now instruction to ones of the plurality of core clusters upon completion of each of the corresponding ones of the plurality of serial threads that requires more than one processing core.

In accordance with another aspect of the present embodiment, a dynamic heterogeneous polymorphic processor is presented. The processor includes a plurality, of processing cores and coalition logic. Each of the plurality of processing cores is assigned to one of a plurality of core clusters and the coalition logic is associated with each of the plurality of core clusters for enabling dynamic heterogeneous polymorphic processing by a coalition of two or more of the plurality of processing cores within the associated one of the plurality of core clusters. Each coalition logic switches the two or more of the plurality of processing cores into a coalition in response to the one of the plurality of core clusters receiving a coalition request command.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present invention.

FIG. 1, comprising FIGS. 1A and 1B, illustrates conventional homogeneous multi-core architectures, wherein FIG. 1A depicts a multiple simple core architecture and FIG. 1B depicts a multiple complex core architecture.

And FIG. 13, including

Skilled artisans will appreciate that elements in the figures are illustrated for simplicity and clarity and have not necessarily been depicted to scale. For example, the dimensions of some of the elements in the block diagrams may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to present methods and architecture for dynamic polymorphic heterogeneous multi-core processor operation that include a plurality of simple cores in a reconfigurable multi-core architecture that can dynamically adapt itself to support both multi-threaded code with explicit thread-level parallelism as well as sequential code with instruction-level parallelism.

Computing systems have made an irreversible transition towards parallel architectures with the emergence of multi-cores. Moreover, power and thermal limits in embedded systems mandate the deployment of many simpler cores rather than a few complex cores on chip. Consumer electronic devices, in particular, need to support an ever-changing set of diverse applications with varying performance demands. While some applications can benefit from thread-level parallelism offered by multi-core solutions, there still exist a large number of applications with substantial amount of sequential code and the sequential programs suffer from limited exploitation of instruction-level parallelism in simple cores. A present embodiment presents a reconfigurable multicore architecture that can successfully reconcile the conflicting demands of instruction level parallelism and thread-level parallelism.

The present embodiment can accelerate the performance of serial code by dynamically forming coalitions of two or more simple cores to offer increased instruction-level parallelism. In particular, the present embodiment can efficiently merge two to four simple 2-way out-of-order cores to reach or even surpass the performance of more complex and power-hungry 4-way or 8-way out-of-order core. Quad-core implementations of the present embodiment can achieve a 17% improvement in performance with a 43% improvement in energy consumption as compared to 8-way out-of-order baseline core architectures on a diverse set of embedded benchmark applications.

Figure 1A:
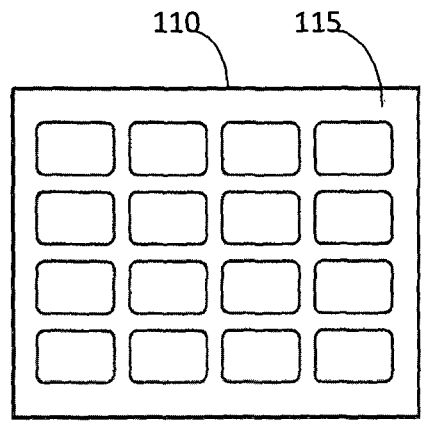
Figure 1B:
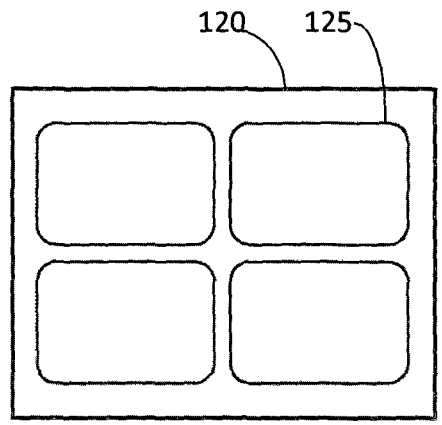
Figure 2:
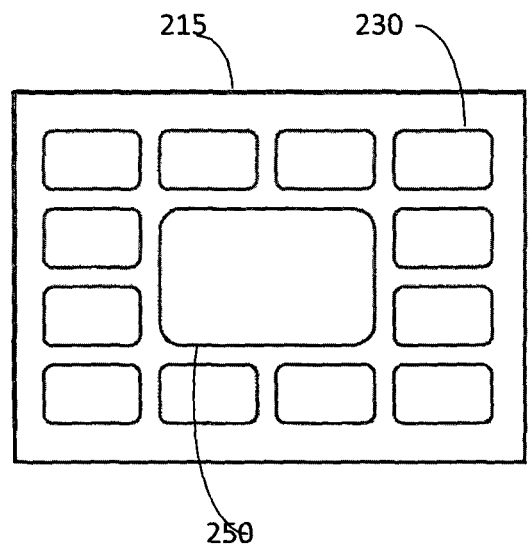
FIG. 2 illustrates a conventional heterogeneous multi-core architecture.

Referring to FIGS. 1 and 2, conventional multi-core architectures are shown. Multi-core architectures can provide parallel processing capability for processing speed-up. However, power constraints arising from lack of corresponding improvements in power usage and power limitations in portable devices prevent powering all of the cores at the same time.

FIG. 1A depicts a homogeneous core architecture 110 of sixteen simple cores 115. This homogeneous core architecture 110 and the plurality of simple cores 115 are ideal for applications with high thread-level parallelism, yet suffer from a lack of instruction-level parallelism support due to large sequential fractions in handling complex applications. FIG. 1B depicts a homogeneous multi-core architecture 120 including four complex cores 125 that is designed for complex applications and easily handles applications with high instruction-level parallelism. Yet, high power consumption and low core usage result when handling applications with high thread-level parallelism.

FIG. 2 depicts a heterogeneous multi-core architecture 215 which includes twelve simple cores 230 and one complex core 250. While this architecture easily handles complex applications and provides high-performance handling of specific applications, it is not adaptable enough to handle other than a specific mix of operations. Such heterogeneous multi-core architectures 215 are generally customized for a particular embedded application domain that can offer significant advantage in terms of performance, power, and area and are beneficial for specific kernels such as audio, video, image processing. However, high-performance embedded platforms (e.g., Smartphones) need to execute a wide variety of general-purpose applications for which the workload is not known a-priori.

Figure 3:
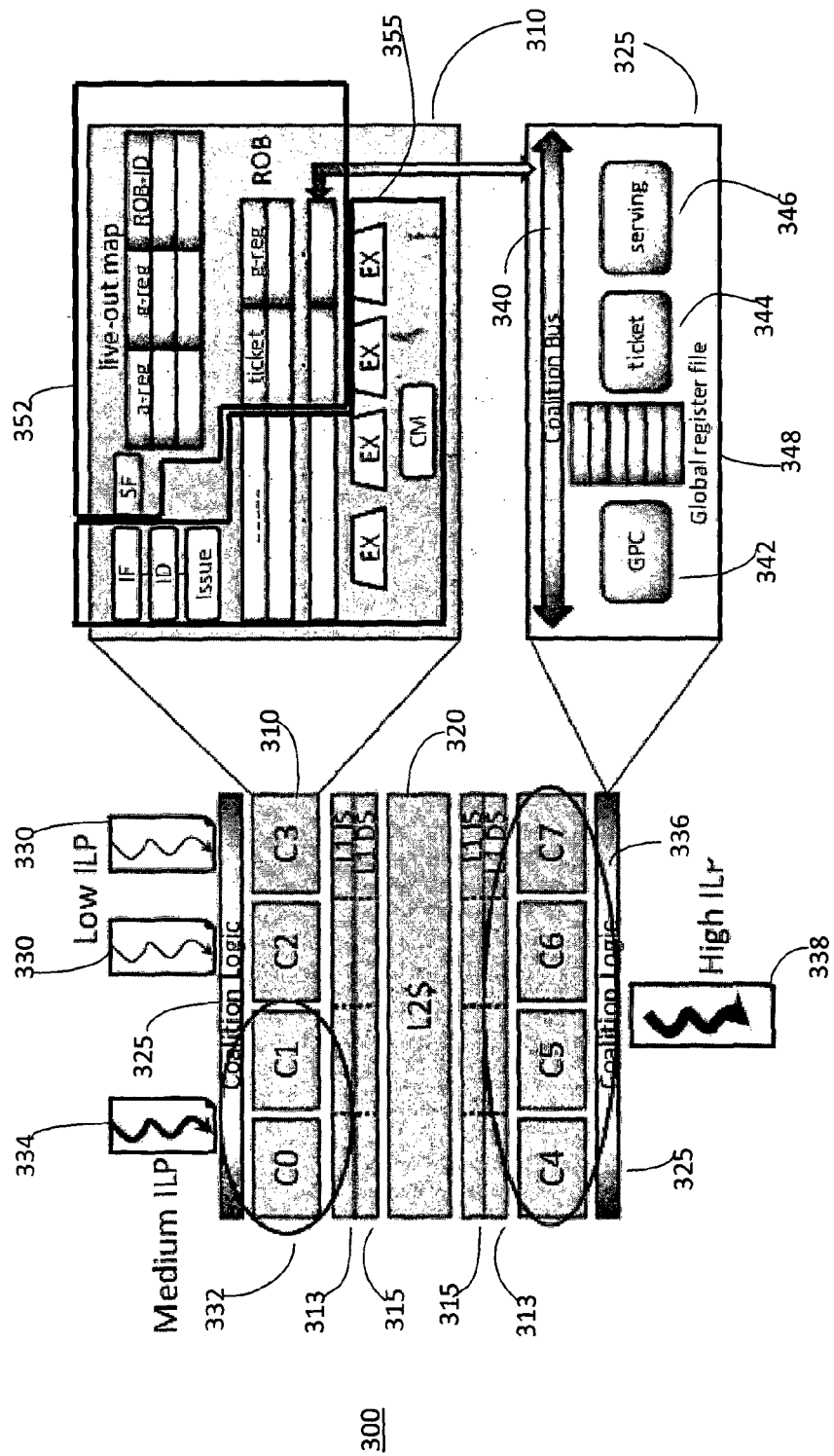
FIG. 3 illustrates a dynamic polymorphic multi-core processor architecture in accordance with the present embodiment.

Referring to FIG. 3, a high level overview of a polymorphic heterogeneous multi-core architecture 300 in accordance with a present embodiment is depicted. The multi-core architecture 300 is fabricated as a homogeneous multi-core system containing multiple identical, simple cores and can be morphed according to the workload into a heterogeneous multi-core architecture at runtime under software directives. Post-fabrication, software can compose together the primitive cores 310 to create a customized multi-core system that best matches the needs of the applications currently executing on the system.

Each core 310 is a simple 2-way out-of-order processor. Four such simple cores form a cluster. The example architecture in FIG. 3 includes two such clusters; but the number of clusters can be easily scaled with technology. A coalition is defined as a group of cores 310 working together to accelerate the execution of a serial stream of instructions. To form a coalition, the cores 310 need to share the data and instruction caches. Reconfigurable L1 instruction cache 313 and L1 data cache 315 are utilized for this purpose. Both L1 instruction and data cache 313, 315 have four banks. In normal mode, each core 310 is allocated a cache bank 313, 315, which behaves as a direct-mapped cache and the cache mapping is configured accordingly. In coalition mode, all the four cache banks together behave as a large 4-way set-associative shared cache. The combined instruction and data L2 cache 320 is shared across all the cores both in normal mode and coalition mode In normal mode, multi-threaded applications are executed on a set of homogeneous cores. However, sometimes the simple core might not be powerful enough to exploit the amount of ILP available in some threads. In that scenario, the architecture 300 configures a subset of its cores 310 to run in coalition mode so that the virtual cores can extract more ILP and implicitly execute the threads faster. The architecture 300 uses limited amount of additional hardware that is shared among the cores 310 and minimal compiler modifications as discussed below.

Coalition logic 325 is coupled to each cluster of processing cores 310 and, in accordance with the present embodiment, enables dynamic heterogeneous polymorphic processing by forming a coalition of two or more of the cores 310 within the core cluster. In normal mode, the multicore architecture 300 can efficiently support multi-threaded execution. The simple 2-way cores 310 can also support simple, low instruction-level parallelism 330. However, the individual cores 310 cannot exploit much instruction-level parallelism (ILP) in sequential applications.

In accordance with the present embodiment, a coalition of two to four cores 310 can be formed in a cluster with minimal additional hardware such that the merged cores 310 can substantially speed up serial code execution. A coalition 332 of two cores 310 can be formed for running a processing task 334 having medium ILP serial threads and a coalition 336 of four cores 310 can be formed for handling a processing task 338 having high ILP serial threads. Forming such coalitions 332, 336 can achieve performances close to that of dedicated 4-way and 8-way out-of-order execution engines. For example, compared to a 2-way core, dual-core processing in accordance with the present embodiment can achieve up to 3.24 times speed-up with an average speed-up of 2.64 times. Quad-core operation in accordance with the present embodiment can achieve up to 5.61 times speed-up with an average speed-up of 4.08 times for embedded applications. More importantly, dual-core and quad-core operation in accordance with the present embodiment can surpass the performance of significantly more complex 4-way and 8-way cores for a large range of applications. In accordance with the present embodiment, coalition size is limited to four cores 310 as speed-up is limited for core complexity beyond 8-way out-of-order cores.

Thus, it can be seen that the present embodiment can achieve the performance of complex out-of-order superscalar processors without paying the price of complex hardware and its associated energy inefficiency and reliability issues. The additional hardware necessary is minimal, is part of the coalition logic 325 coupled to a coalition logic bus 340, and is utilized to handle parallel processing in multiple cores 310 when the cores 310 are formed into a coalition. The coalition logic 325 includes three dedicated registers for synchronization among the cores 310 (a global program counter 342, a ticket register 344 and a serving register 346), and a shared global register file 348. Operation of the coalition logic 325 will be explained in more detail below.

Thus, it can be seen by those skilled in the art that the only additional hardware required is the coalition logic 325 which includes the shared global register file 348 to communicate values between the basic blocks 420 running on different cores 310. The coalition bus 340 also couple's the coalition logic 325 to each of the cores 310 in a cluster. A minimal amount of additional resources 352 is added to the internal architecture of the cores 310 to support coalition. Those skilled in the art will recognize that the remaining structure of the cores 310 shown in FIG. 3 is a conventional core structure and the main execution engines 355 of the cores 310 remain completely unchanged.

The Present architecture 300 successfully re-conciliates the conflicting requirements of applications with explicit thread-level parallelism (TLP) and single-threaded serial applications with high degree of instruction-level parallelism (ILP). The architecture 300 comprised of multiple simple homogeneous cores 310 is ideally suited to take advantage of TLP. But there exists a large class of applications with substantial sequential code fragments that are difficult, if not impossible, to parallelize. Amdahl's law states that the speed-up of such applications is limited by the performance of the serial code. Only complex out-of-order execution engines with high-degree of superscalarity (4-way or 8-way) can transparently accelerate sequential code fragments through aggressive exploitation of ILP. Power and thermal limits, as well as reliability issues, do not permit deployment of such complex cores in embedded systems. However, it has been shown through simple analysis how an application can achieve speed-up much beyond the limit of Amdahl's law if the underlying architecture can be dynamically reconfigured between a small number of complex cores exploiting ILP and a large number of simple cores exploiting TLP. The architecture 300 achieves this seamless transition between ILP and TLP by forming at runtime a coalition of two to four cores 310 to create virtual 4-way or 8-way superscalar cores.

The idea of composing simple cores together to accelerate serial code is not new. However, prior solutions either require significant additional shared hardware resources and modifications to the internal architecture of the composable cores, or follow a radically different instruction set architecture (ISA) that requires complete re-engineering of the software model and aggressive compiler optimizations. In contrast, the present embodiment presents a hardware-software cooperative solution that demands minimal changes to both hardware and software.

Figures 4, 5:
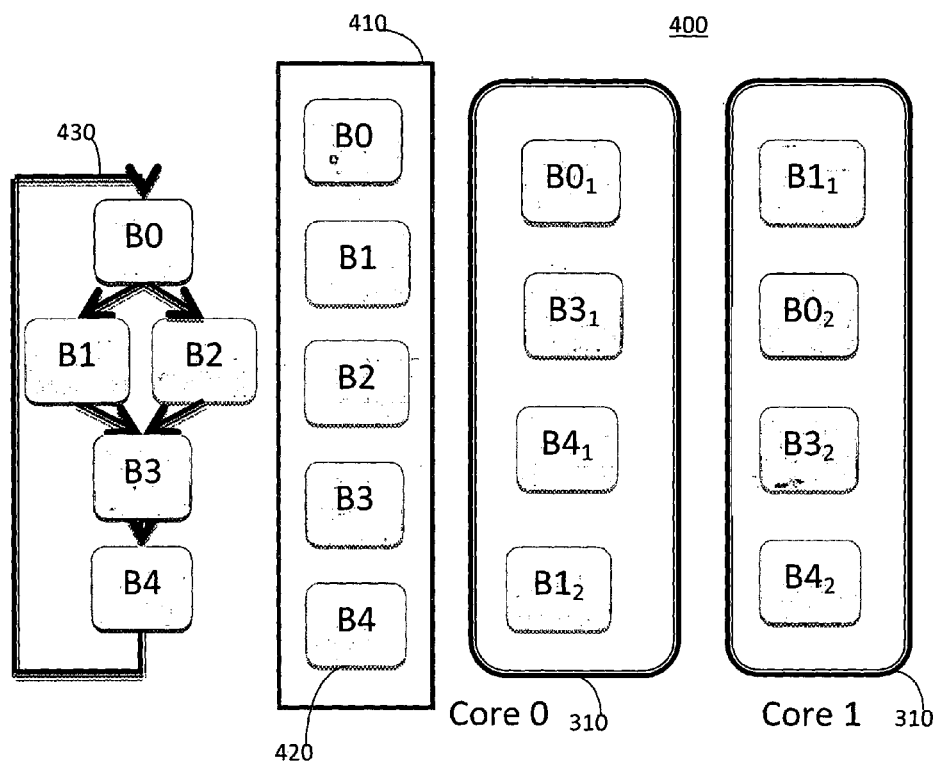
FIG. 4 pictorially depicts basic block processing by the processor architecture of FIG. 3 in accordance with the present embodiment.
FIG. 5 depicts a sentinel instruction format in accordance with the present invention.

Referring to FIG. 4, basic block processing 400 in accordance with the architecture 300 is depicted. The architecture 300 (FIG. 3) follows a distributed execution model in coalition mode. The unit of execution for a core is a basic block 420, which is a sequence of instructions with single entry and single exit point. When a processing task comprising a plurality of serial threads 410 is received, each of the plurality of serial threads 410 is divided into a plurality of basic blocks 420 ($B_0$ to $B_4$). A core 310 fetches and executes one basic block 420 at a time. In accordance with the present embodiment, the basic blocks 420 are executed in parallel on the cores 310 that form a coalition and thereby achieve speed-up for serial code. The cores 310 fetch basic blocks 420 for execution. As soon as a core 310 completes fetch, decode, and rename of all the instructions in a basic block 420, it attempts to fetch the next available basic block 420.

When a serial thread 410 requires more than one processing core 310, a go-into-coalition-mode-now instruction is sent to ones of the cores 310 in the core cluster required for handling the serial thread 410 (in FIG. 4, this is a medium ILP serial thread 410 and a coalition with Core 0 and Core 1 is formed). The basic blocks 420 are then processed by the cores 310.

Thus it can be seen that the present embodiment in coalition mode follows a distributed execution model that avoids complex centralized fetch/decode, dependency resolution, and instruction scheduling of previous approaches. It needs support from compiler to identify the basic blocks 420 and their register dependencies. The compiler detects live-in and live-out registers corresponding to each basic block 420. The term live-in register indicates a register that is alive at the entry of a basic block 420 and is actually used inside the basic block 420. The term live-out register stands for a register that is alive at the exit of a basic block 420 and is actually updated inside the basic block 420. The live-in and live-out registers correspond to inter basic block 420 dependencies and it is possible for the same register to appear as both live-in and live-out registers. An instruction, called a sentinel instruction, is utilized in accordance with the present embodiment to encode this information and the compiler adds a sentinel instruction in the beginning of each basic block 420. That is, the compiler splits the program into basic blocks 420 which are delimited by sentinel instructions.

Referring to FIG. 5, the structure of a sentinel instruction 500 is depicted. The compiler adds a sentinel instruction 500 to each of the plurality of basic blocks 420 of serial threads that require more than one processing core which allows the architecture 300 to supply its processing advantages to any ISA that can be extended with the sentinel instruction 500. With a 64-bit instruction format, the sentinel instruction 500 includes information for processing of the plurality of basic blocks 420 including operation code data 510, length of basic block data 520, end-with-branch data 530, up, to three live-in registers 540, and up to three live-out registers 550. The length of basic block data 520 specifies the length of the basic block 420 which is delimited by this sentinel instruction 500. By setting the field of the length of basic block data 520 to four bits, at most sixteen instructions can be supported in a basic block 420. If the size of a basic block 420 exceeds sixteen instructions, it is split into two or more basic blocks 420. The end-with-branch data 530 is a one-bit field that specifies if the basic block 420 ends with a branch instruction or not.

Figure 6:
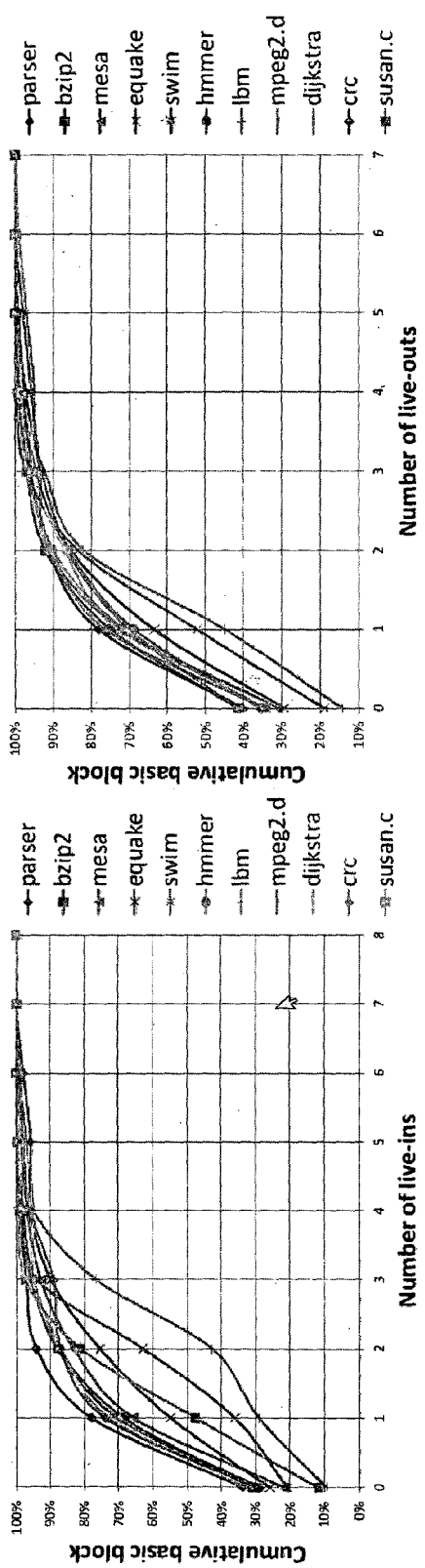
FIG. 6 includes graphs depicting the percentages of basic blocks with number of live-in and live-out registers below a threshold percentage in accordance with the present embodiment.

The next six fields hold the live-in registers 540 and the live-out registers 550 for the basic block 420. FIG. 6 depicts the percentage of basic blocks 420 with number of live-in and live-out, registers below certain thresholds for some SPEC and embedded benchmarks. For almost all benchmarks, 90% of basic blocks 420 contain less than or equal to three live-in and live-out registers. Thus, the sentinel instructions 500 in accordance with the present invention are constrained to have three or less live-in registers 540 and three or less live-out registers 550. If a basic block 420 contains more than three live-in registers 540 or more than three live-out registers 550, the compiler splits the basic block 420 into two or more sub-blocks so as to satisfy the constraint.

Figure 7:
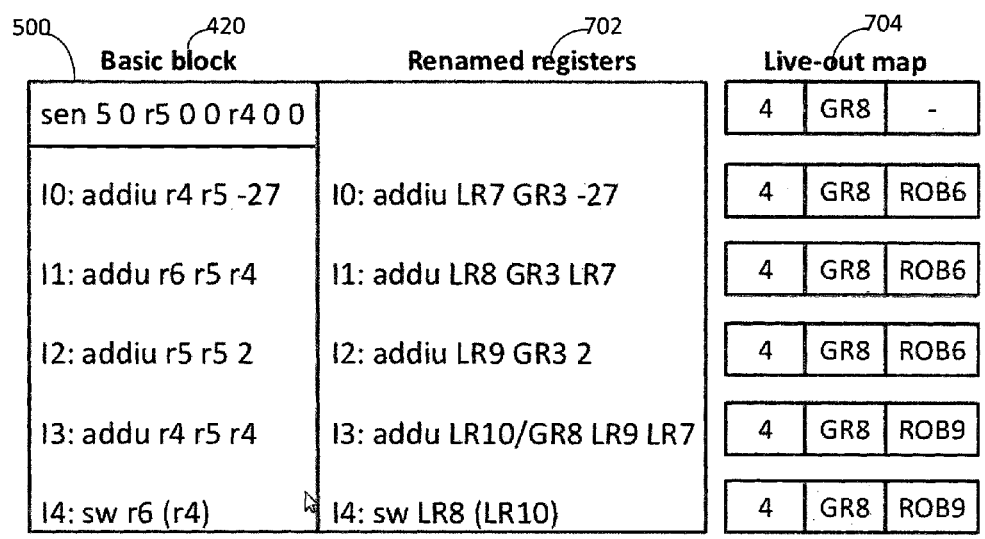
FIG. 7 depicts an example of global register and local register renaming during processing operation of a basic block by the processor architecture of FIG. 3 in accordance with the present embodiment.

FIG. 7 shows an example of register renaming with a basic block 420 showing the sentinel instruction 500 and five instructions (I0 to I4). Notice that r5 is defined locally by instruction I2, and used locally by instruction I3. Similarly, r4 is defined multiple times (I0 and I3); but the last definition in I3 is treated as live-out. The basic block 420 has one live-in register (r5) and one live-out register (r4).

When the sentinel instruction 500 is fetched, the core accesses the global register map where r5 has been renamed to global physical register GR3. Therefore, in the local register map 702 as well we map r5 to GR3 at instructions I0 to I3. When the regular instructions are fetched within the basic block 420, they get renamed as usual using only the local register map 702. Hence, source register r5 in instructions I0, I1, I2 is renamed to GR3. Instruction I2, however, redefines register r5. At this point, r5 gets renamed to a local physical register LR9. So the next instruction I3 uses LR9 for source register r5. Thus, the same register r5 initially gets mapped to a global physical register and then gets mapped to a local physical register. On the other hand, register r6 in instruction I1 is always mapped to local physical register as it does not belong to the live-in register list.

The core needs to rename the live-out registers. First, the core requests the global register renaming logic to supply a free global physical register corresponding to each live-out register. This mapping information is maintained in the global register map as well as in a special local table called live-out map 704. The live-out map 704 contains only three entries corresponding to three live-out registers. Each entry is a 3-tuple containing (a) an architectural register index, (b)

a global physical register index, and (c) a reorder buffer (ROB) ID of the instruction that last mapped the corresponding architectural register. The live-out map 704 maps register r4 to free global physical register GR8. The ROB entry is not yet known Note that we do not immediately copy the live-out mapping into the local register map. This is because a live-out register 550 can be defined multiple times within a basic block 420 and only the last write to the register should be communicated to the global register file 348. For example, live-out register r4 gets defined at both instruction I0 and I3. However, only I3 should write to the global register file.

In a 2-way out-of-order processor, we need to rename four source registers and two destination registers per cycle. In contrast, the sentinel instruction 500 requires renaming three source registers and three destination registers. Unlike normal instructions where the hardware needs to identify possible dependencies among the registers being renamed in parallel, only three free physical registers for each sentinel instruction needs to be identified. And it is easy to rename three registers in one clock cycle for a sentinel instruction 500.

The fetching and renaming of regular instructions in the basic block 420 proceeds. For example, r4 gets renamed to local physical register LR7 in I0 and then to LR10 in I3. Whenever r4 gets renamed, the ROB ID of the corresponding instruction is copied into the live-out map 704. Originally, the ROB ID is ROB6 corresponding to I0 and then it changes to ROB9 corresponding to I3.

Whenever a normal instruction with live-out register gets renamed, the global register file index is copied into the corresponding ROB entry. Later, if the live-out register is renamed again in the basic block 420, the global register file index is removed from the previous ROB entry and added to the new ROB entry. For example, initially ROB entry ROB6 for instruction I0 contains global register index GR8 and is later removed when ROB9 for I3 is updated with global register file index GR8. When an instruction that defines a live-out register 550 completes execution, it writes the value into both the local and global register file 348. For example, when I3 completes execution, the value of register r4 will be written to both LR10 and GR8. In addition, when a core 310 writes to the global physical register file 348, it needs to broadcast the information on the coalition bus 340 (FIG. 3) so that other cores 310 dependent on this register can get the value. Finally, when such an instruction is ready to commit, the value is committed to the global register file 348.

It is possible that a regular instruction that last defines a live-out register value (e.g., I3) completes execution even before the whole instruction corresponding to its basic block 420 have been fetched and renamed. In that case, when the instruction executed, it is not guaranteed that it needs to write the value into the global register file 348. This information is known only when all the instructions in the basic block 420 have been renamed. For this reason, instructions from a basic block 420 are not allowed to broadcast and commit live-out registers till all the instructions from that basic block 420 have been fetched and renamed.

Even though the cores 310 in a coalition can perform fetch, rename, execute, and register writes in parallel, only one core 310 can perform commit per cycle to satisfy in-order commit. However, we are not restricted to at most two instructions commit per cycle. This is because all the instructions with local register destination do not need to commit. Only the instructions with live-out destination registers and memory instructions need to commit to the global register file 348. Therefore, only at most two instructions are restricted to commit with live-out destinations and memory instructions per cycle. Hence, the commit stage does not become a bottleneck when emulating 4-way or 8-way processor operation.

Also, the architecture 300 and its basic block processing operation as shown in FIG. 7 uses classic register renaming for both local and global register files. As mentioned before, the coalition logic 325 includes the shared global register file 348 that includes a global register map and a global physical register file. The size of the global register map is determined by the number of registers in the processor ISA. The size of the global physical register file, however, depends on the fraction of register accesses that require global register file. In accordance with the present embodiment, forty entries are allocated for the global physical register file.

When a core 310 fetches a sentinel instruction 500, it has to handle the live-in and live-out registers 540, 550. For a live-in register 540, there can be two scenarios. In the first case, the value corresponding to the global register has already been produced by a previous basic block 420. The core 310 only needs to copy this value into the local register file. In the second case, the value is not yet ready. The register renaming logic then simply copies the mapping from the global register map to the local register map. That is, the local register map for the live-in register 540 now points to a global register file 348 entry.

Figure 8:
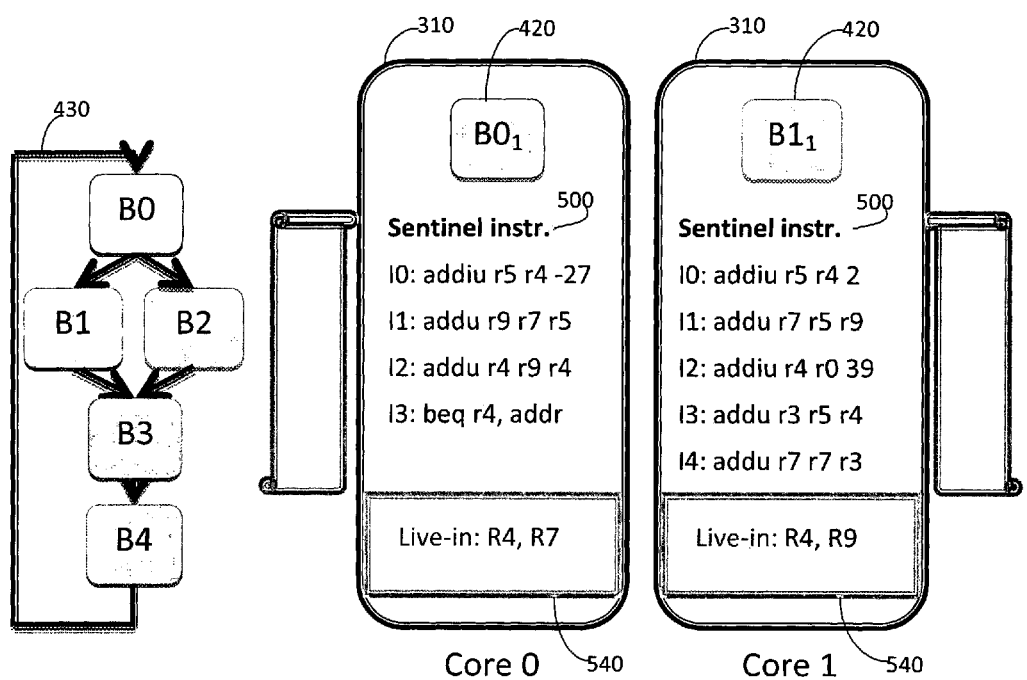
FIG. 8 pictorially depicts sentinel instruction information for basic block processing by the processor architecture of FIG. 3 in accordance with the present embodiment.
Figure 9A:
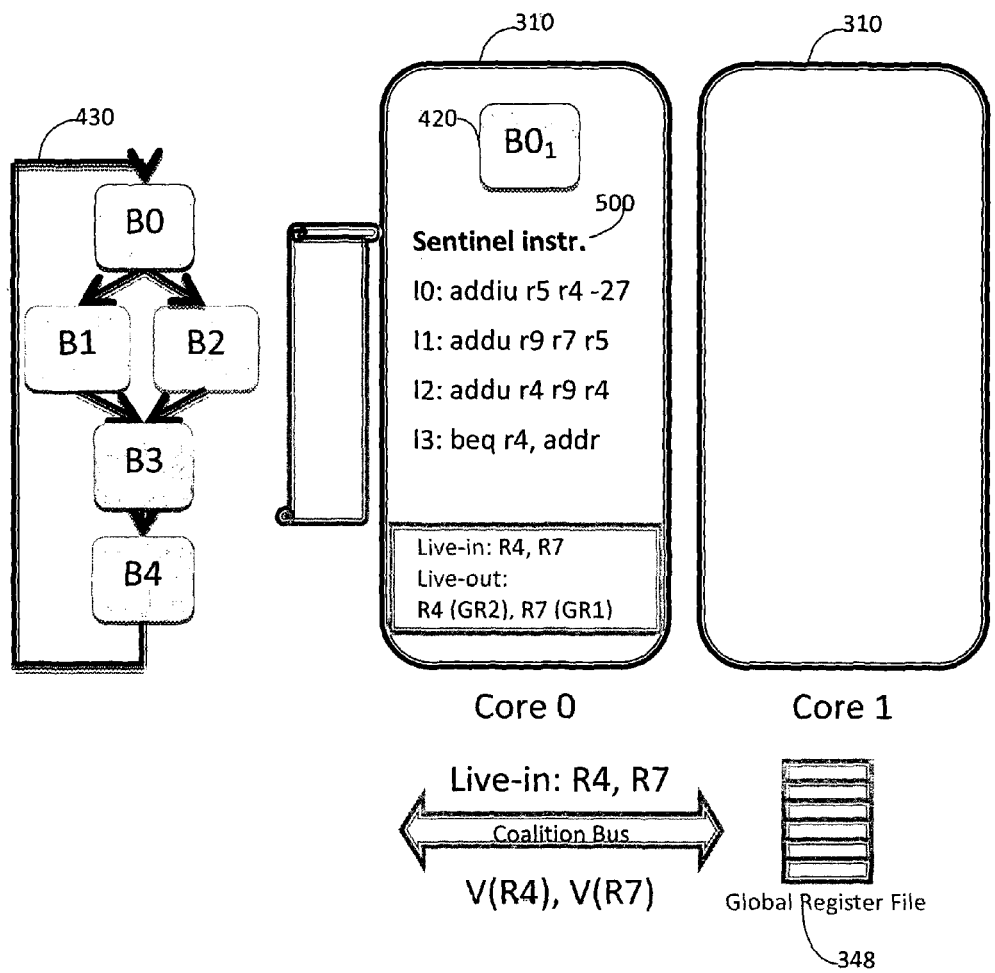
FIG. 9, comprising FIGS. 9A to 9D, pictorially depicts a parallel basic block processing operation by the processor architecture of FIG. 3 utilizing global registers for controlling live-in/live-out operation of the basic block processing in accordance with the present embodiment.
Figure 9B:
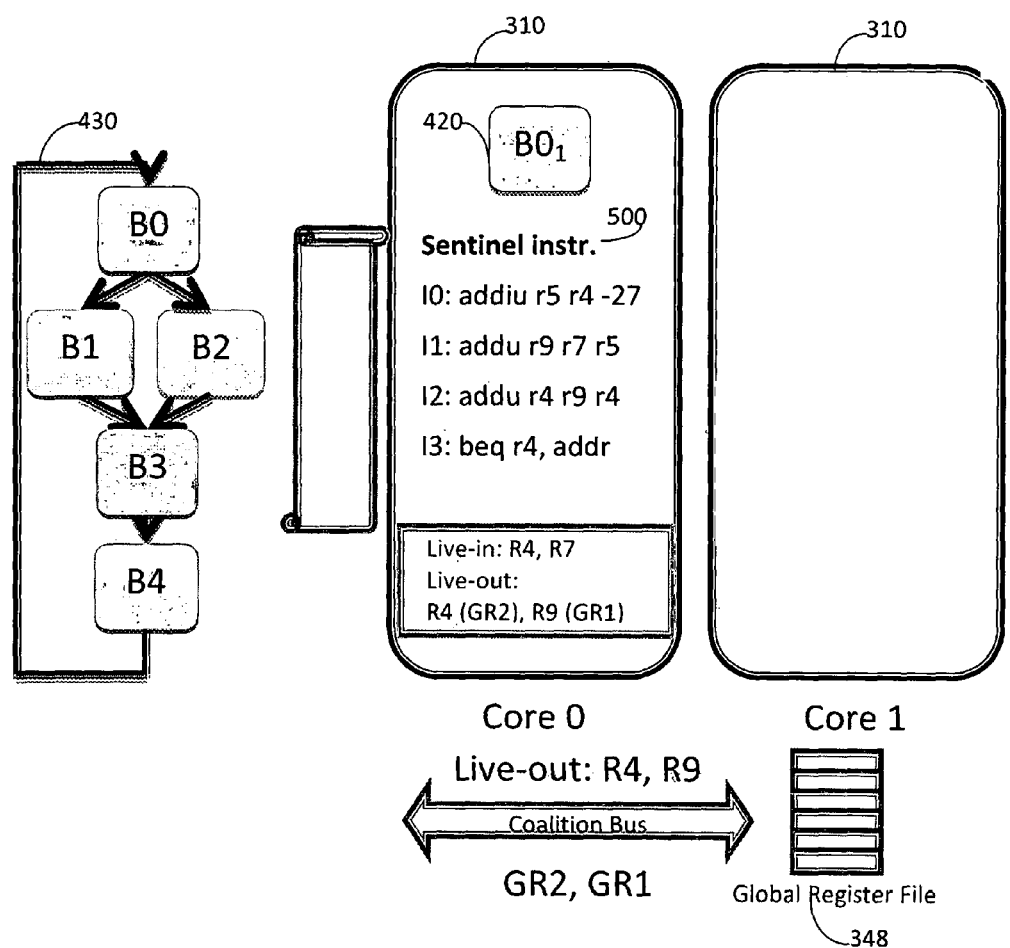
Figure 9C:
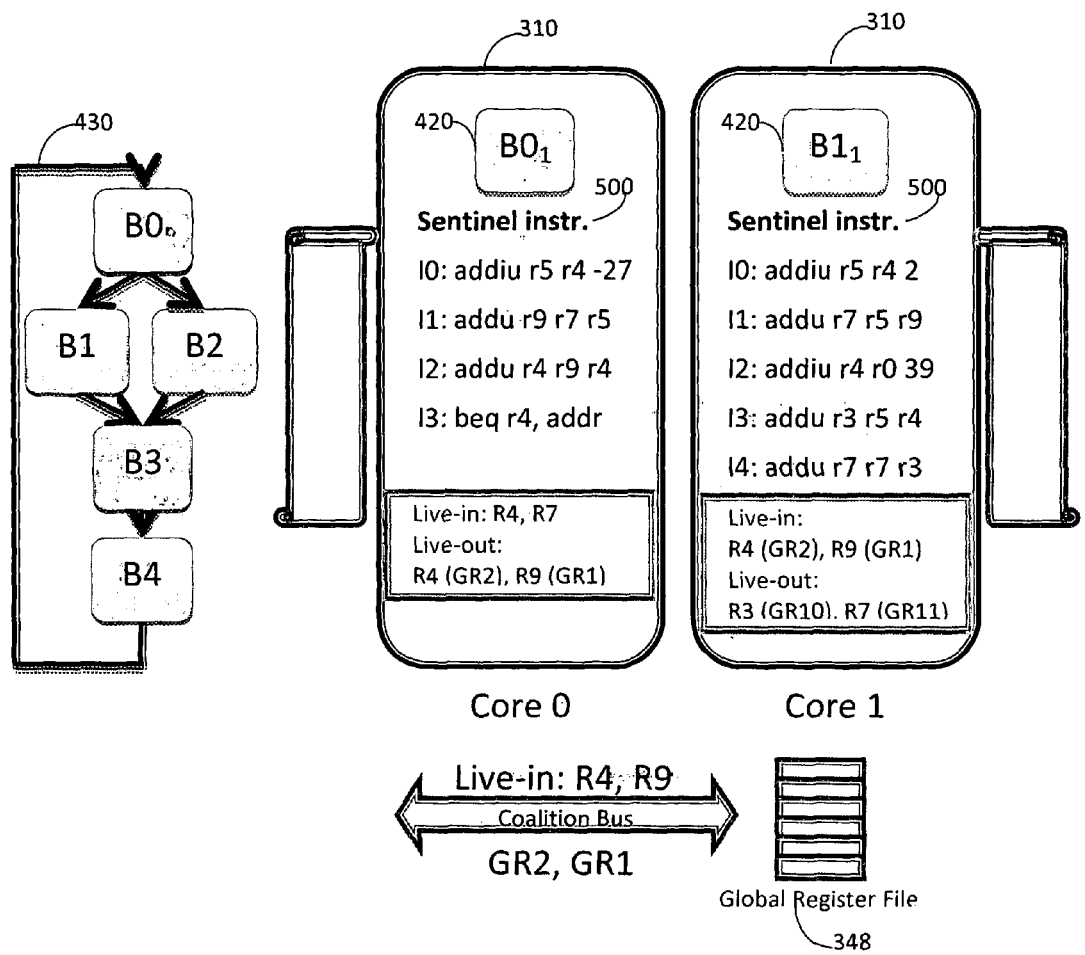
Figure 9D:
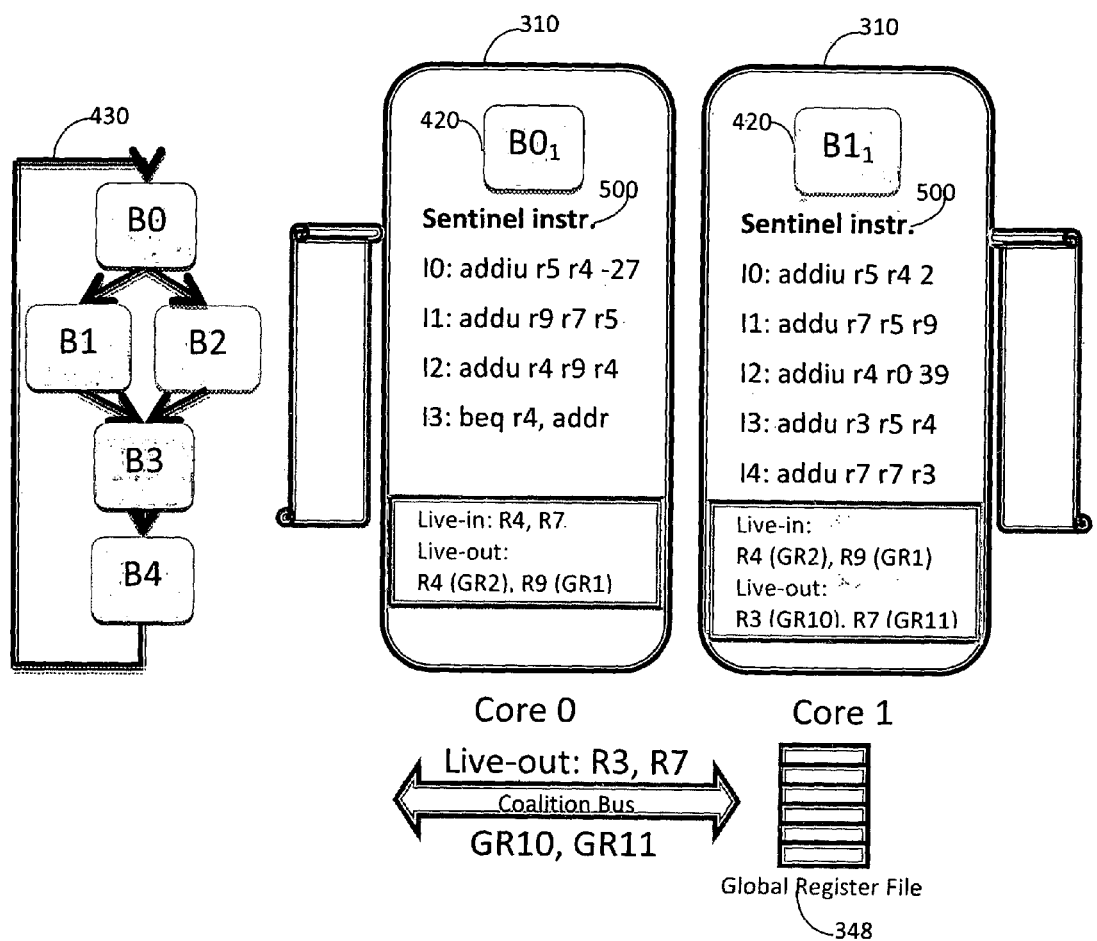

Referring to FIG. 8, the basic blocks 420, $B0_1$ and $B1_1$, and their sentinel instructions 500 are depicted, including the live-in register values 540 and the instructions I0 to I4. In this manner, the dependencies among the basic blocks 420 are explicitly conveyed in the program code. The cores 310 can fetch and execute different basic blocks 420 in parallel, thereby achieving performance speed-up.

In the architecture 300, the base processing cores 310 are 2-way out-of-order execution engines that use register map tables to rename architectural registers into physical registers. The registers local to a basic block 420 can remain in the core-local register file. However, the live-in and live-out register values have to be communicated among the cores 310. Referring to FIGS. 9A to 9D, operation of the global register file 348 that is shared across the cores 310 is depicted. This includes a global map table 902 and a global physical register file 348. The live-in registers 540 have to be read from the global register file 348, while the live-out registers 550 have to be written into the global register file 348. Thus live-in and live-out registers 540, 550 have to be renamed using the global map table The sentinel instructions take care of global register renaming as progressively shown in FIGS. 9A, 9B, 9C and 9D.

Any out-of-order execution core 310 should rename registers in program order as well as commit instructions in program order. As the global (inter basic block) dependencies are encapsulated in the sentinel instructions 500, execution of the sentinel instructions and renaming of the global registers need to occur in program order. A global program counter (GPC) that is shared across the cores is used to ensure program order. The GPC also comes with a locking mechanism such that only one core can access and update the GPC at any point of time.

Figure 10A:
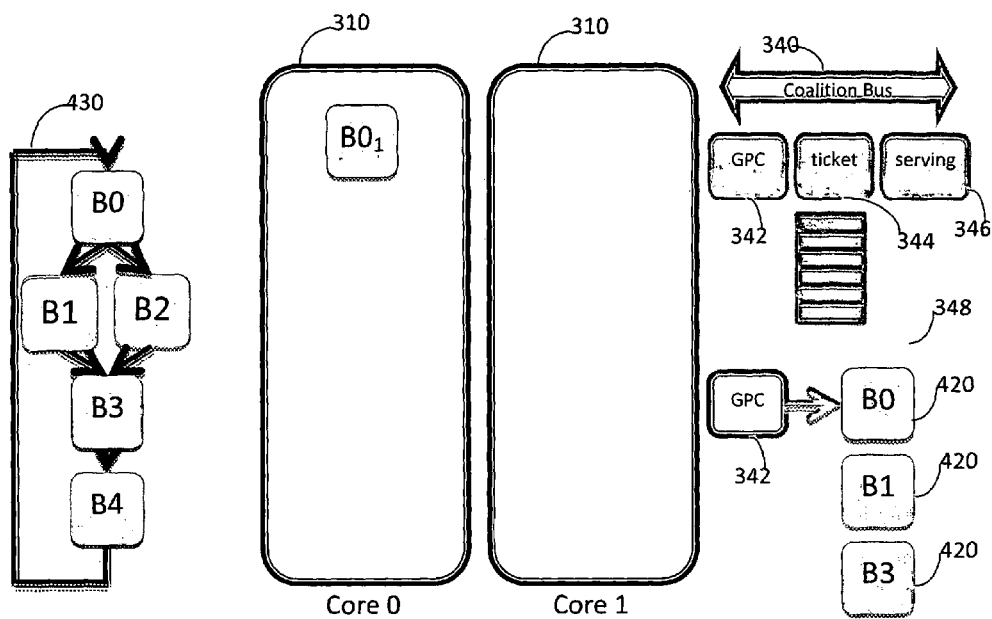
FIG. 10, comprising FIGS. 10A to 10D, pictorially depicts a parallel basic block processing operation by the processor architecture of FIG. 3 utilizing a global program counter in accordance with the present embodiment.
Figure 10B:
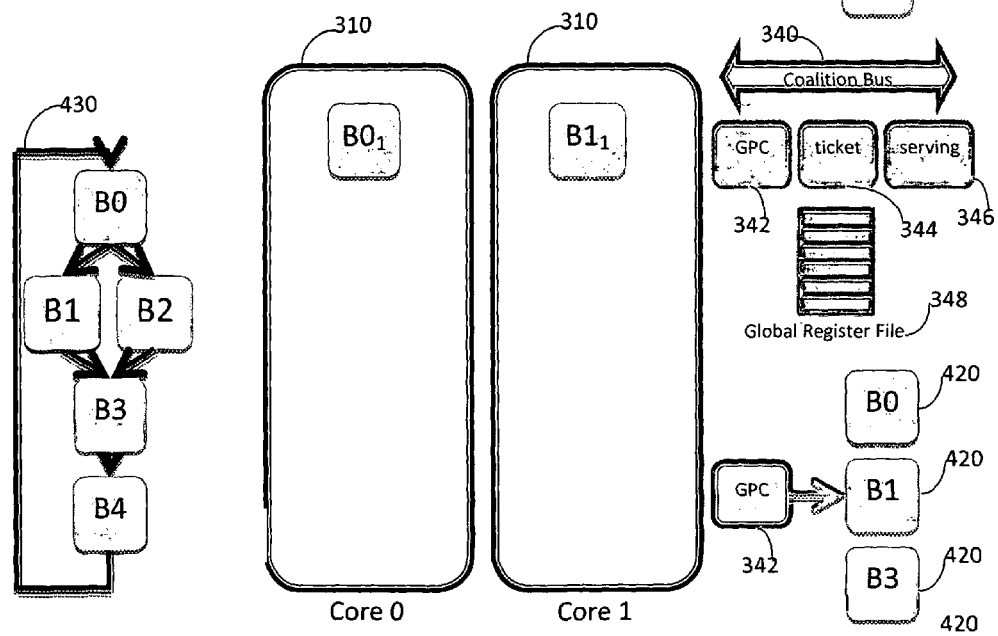

Referring to FIGS. 10A to 10D, the processing of the basic blocks 420 in a coalition including Core 0 and Core 1 under control of the global program counter 342 is depicted. As can be seen in FIG. 10A, initially the GPC 342 points to the sentinel instruction in the very first basic block $B0_1$ of the program. The first basic block $B0_1$ is then fetched by Core 0. Once Core 0 fetches the sentinel instruction and completes global register renaming, it updates the GPC 342 to point to the next basic block 420 (i.e., the next sentinel instruction 500). If the basic block 420 ends with a branch instruction, the GPC 342 will be updated with the predicted target address generated by the branch predictor in the core 310. Referring to FIG. 10B, the global program counter 342 moves to basic block B1 and Core 1 fetches the second basic block $B1_1$ (presuming correctly that $B0_1$ branches to $B1_1$). In this manner, the GPC 342 is incremented by the length of the basic block (as evidenced by the length-of-block data 520). In other words, the GPC 342 always points to a sentinel instruction 500. After updating, the core 310 releases the lock on the GPC 342 allowing the next core (or the same core) to lock the GPC register.

Figure 10C:
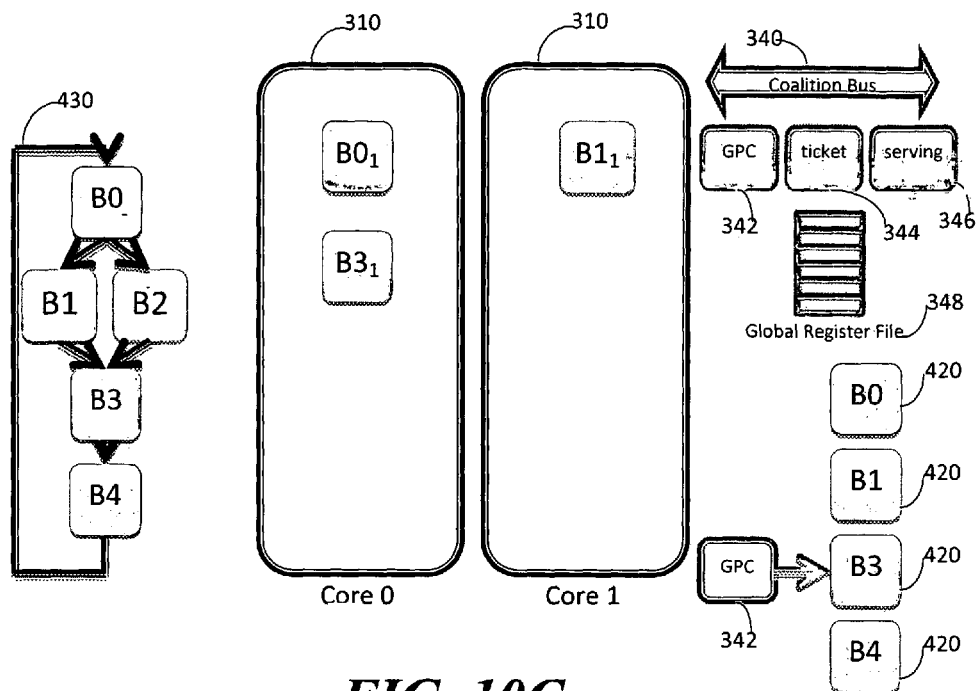
Figure 10D:
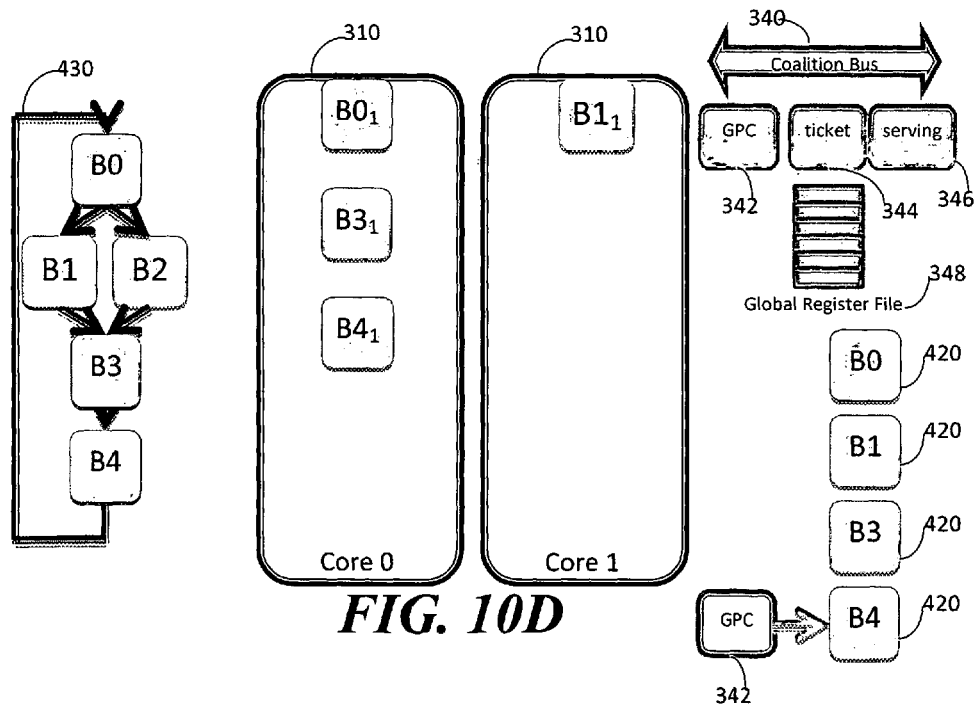

Thus the core starts fetching the instructions from the basic block 420 and then executes them out-of-order whenever their operands are ready (i.e., all the local and global dependencies are resolved). Referring to FIG. 10C, as the processing of basic block $B1_1$ continues after the processing of basic block $B0_1$ is complete, the global program counter 342 moves to basic block B3 and Core 0 fetches basic block $B3_1$. And, referring next to FIG. 10D, Core 0 has finished processing the basic block $B3_1$ before Core 1 finishes processing basic block $B1_1$. So, when the global program counter 342 moves to B4, Core 0 fetches basic block $B4_1$.

In this manner, the architecture 300 resolves register and memory dependencies among the basic blocks 420 so as to maintain correct processing order during parallel execution. Instead of relying on a complex hardware mechanism to detect interdependency among the basic blocks 420, a hardware-software co-operative solution is utilized by the present embodiment to ensure that the cores 310 fetch, rename and commit the basic blocks 420 in program order. The execution of the instructions from different basic blocks 420 can therefore be performed out-of-order, the speed-up of the present embodiment resulting primarily from this out-of-order parallel execution of instructions from different basic blocks 420 on different cores 310.

The in-order commit constraint is to handle speculative execution and precise exception and is handled through a shared ticket lock mechanism. Referring to FIGS. 11A to 11H, operation of the ticket lock mechanism is depicted through eight successive operations. The ticket lock mechanism contains two registers: a serving register 346 and a ticket register 344. Both are initialized to 0. The ticket register 344 is used to keep track of the order in which the basic blocks 420 are fetched by the cores 310. When a core 310 locks the GPC 342, it also reads and increments the current value of ticket register 344. It then tags the reorder buffer (ROB) entries of all the instructions in the basic block 420 with this ticket value. That is, each basic block of instructions is tagged with a unique ticket value and the ticket values are assigned to basic blocks 420 in program order.

The serving register 346 dictates which set of instructions are allowed to be committed. At any point in time only one core 310 is permitted to commit instructions. That is the core for which the instructions are ready to be committed and their associated ticket number matches the value held by the serving register 346. The serving register 346 is incremented after all the instructions from the basic block 420 are committed.

Figure 11A:
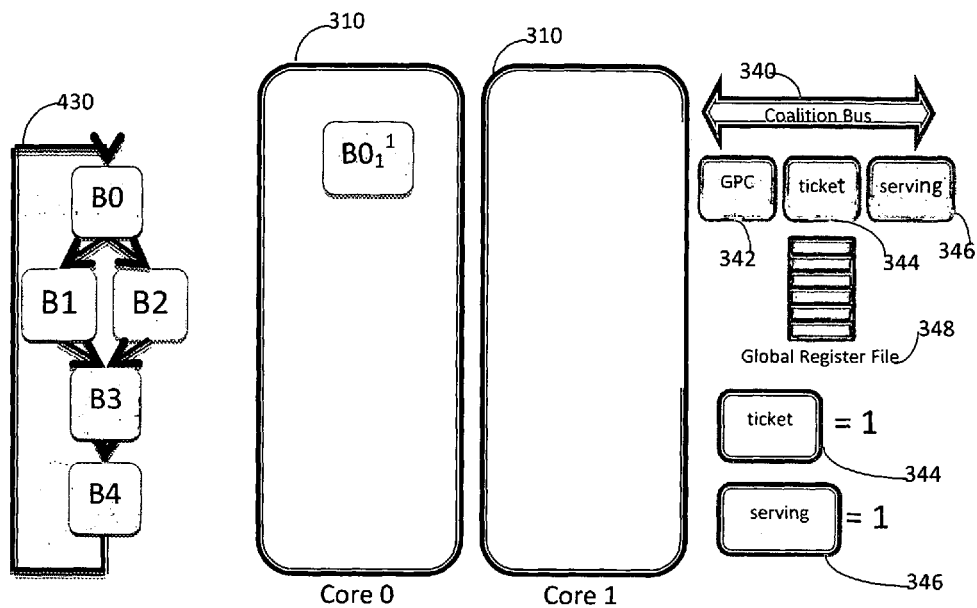
FIG. 11, comprising FIGS. 11A to 11H, pictorially depicts a parallel basic block processing operation by the processor architecture of FIG. 3 utilizing a serving register and a ticket register in accordance with the present embodiment.
Figure 11B:
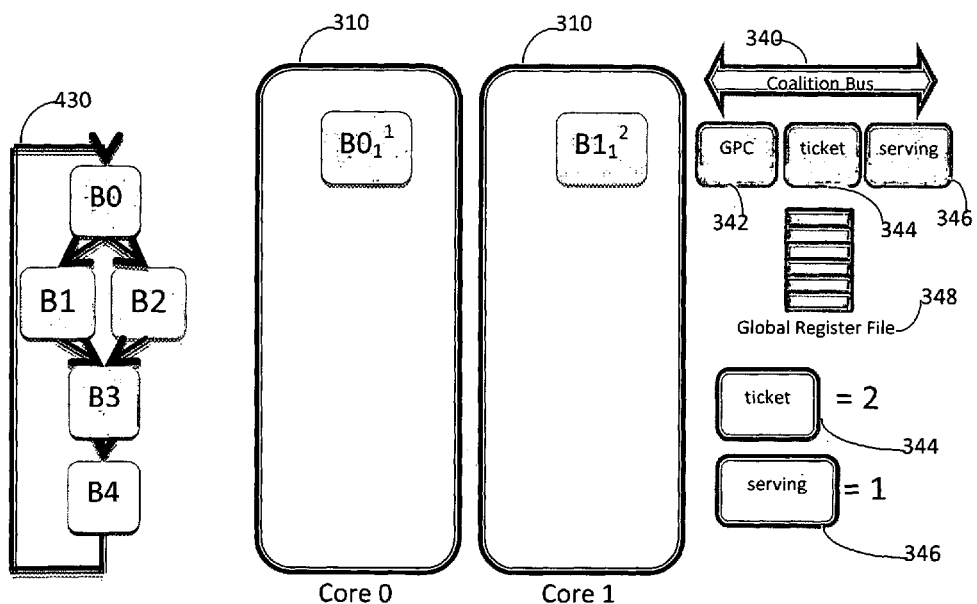
Figure 11C:
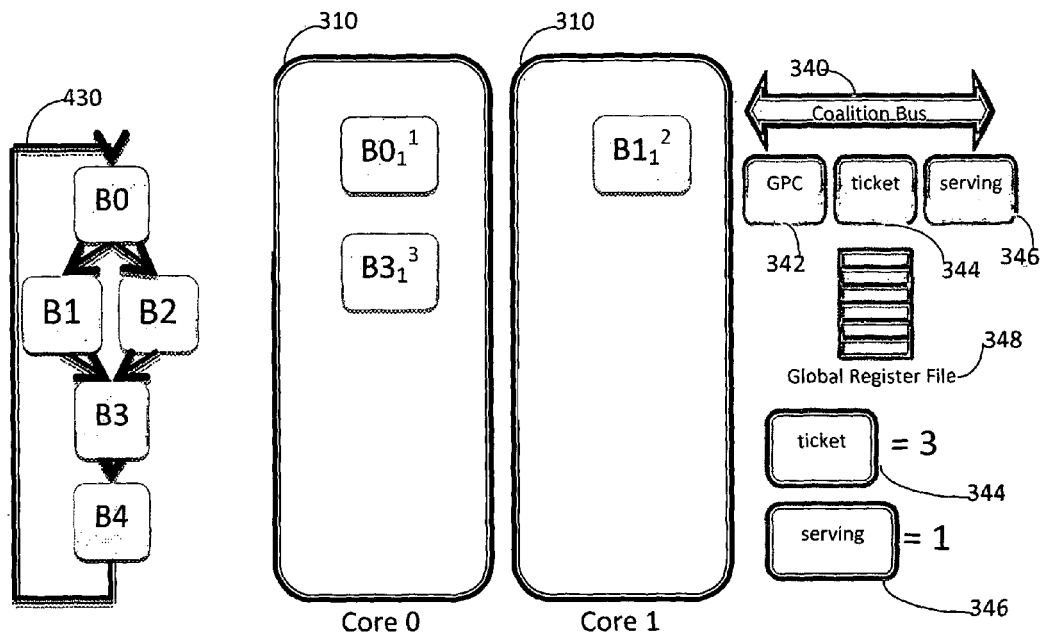
Figure 11D:
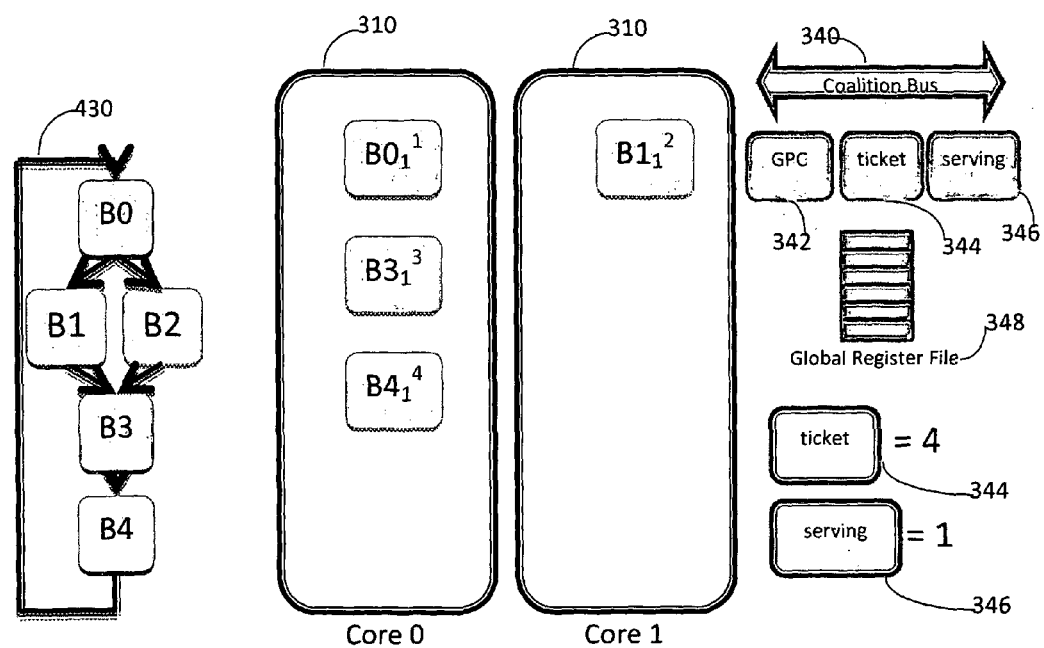

Referring to FIG. 11A, the ticket register 344 is incremented by one and basic block $B0_1$ is fetched by Core 0 with ticket register value 1. The serving register 346 is incremented by one and processing of basic block $B0_1$ is committed with serving register value 1. The ticket register 344 is then incremented again. Referring to FIG. 11B, basic block $B1_1$ is fetched by Core 1 with ticket register value 2. As all the instructions from the basic block $B0_1$ are not yet committed, the serving register is not incremented. Referring next to FIG. 11C, the ticket register 344 is incremented by one and basic block $B3_1$ is fetched by Core 0 with ticket register value 3. At FIG. 11D, the ticket register 344 is again incremented by one and basic block $B4_1$ is fetched by Core 0 with ticket register value 4. All of the instructions from the basic block $B0_1$ are now committed, so the serving register is incremented by one.

Figure 11E:
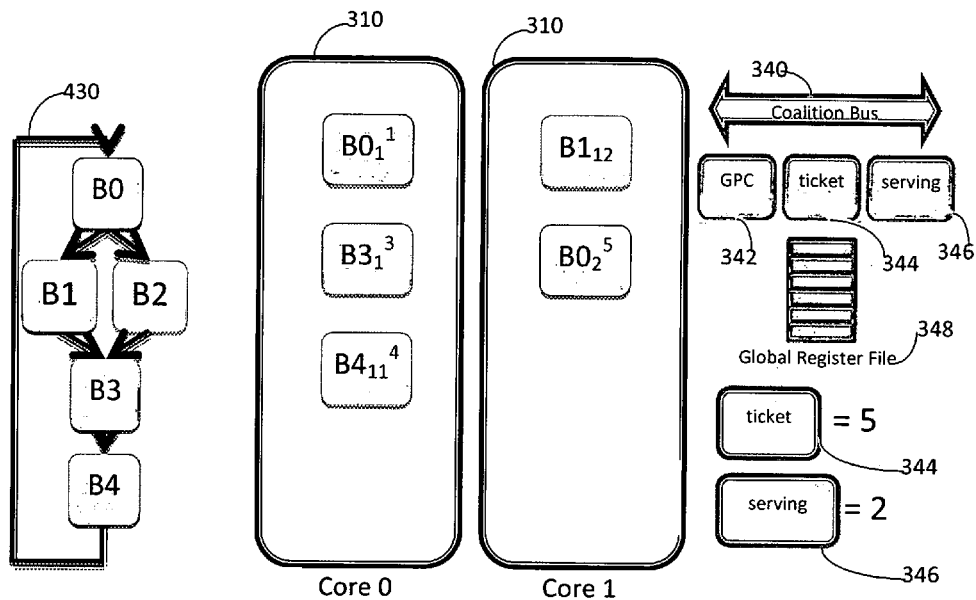
Figure 11F:
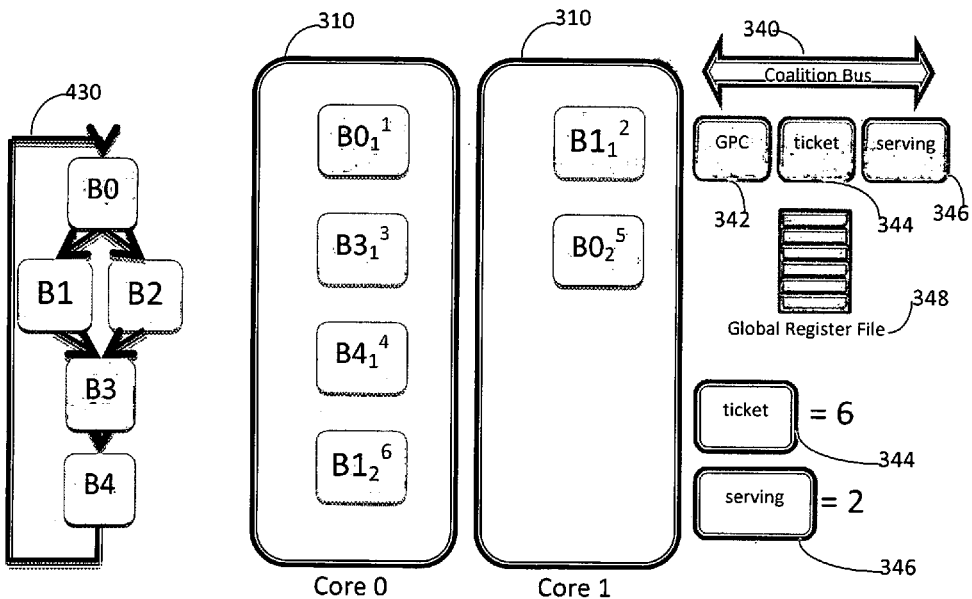
Figure 11G:
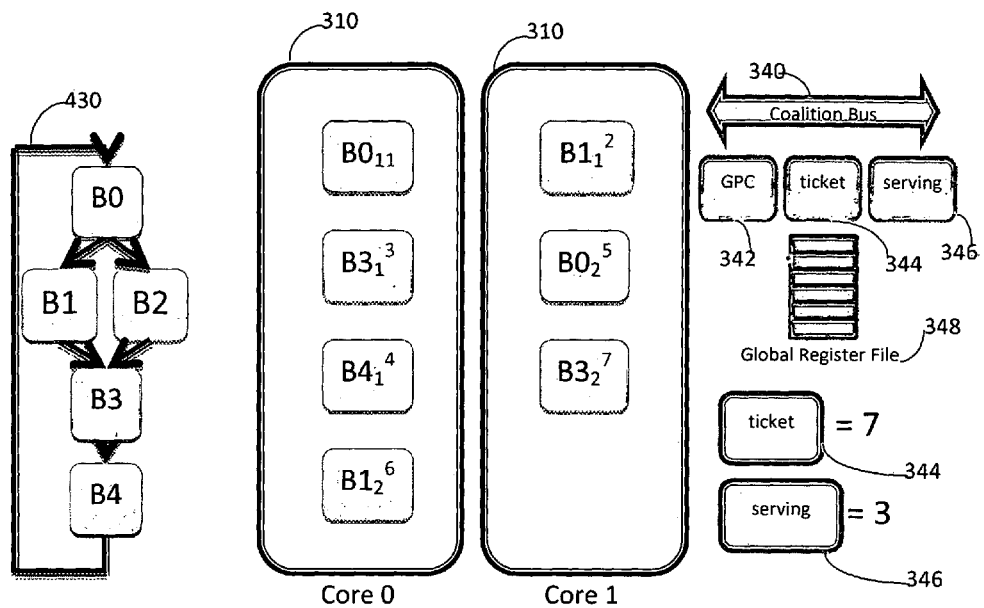
Figure 11H:
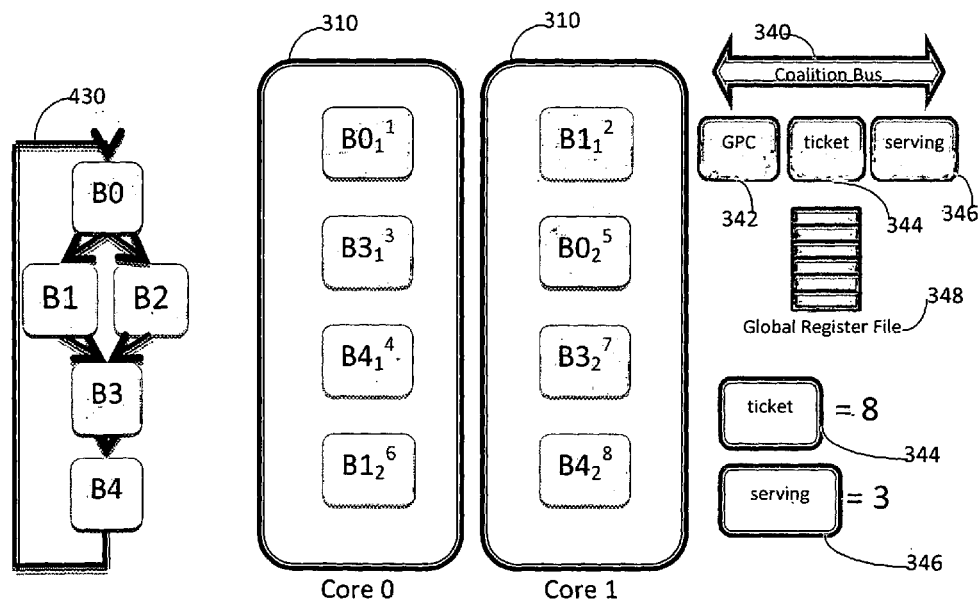

Referring to FIG. 11E, the ticket register 344 is again incremented by one and basic block $B0_2$ is fetched by Core 1 with ticket register value 5. Processing of basic block $B1_1$ is committed with serving register value 2. The ticket register 344 is then incremented again. Referring to FIG. 11F, basic block $B1_2$ is fetched by Core 0 with ticket register value 6. As all the instructions from the basic block $B1_1$ are committed, the serving register is now incremented by one. Referring next to FIG. 11G, the ticket register 344 is incremented by one and basic block $B3_2$ is fetched by Core 1 with ticket register value 7. The serving register value is now 3. At FIG. 11H, the ticket register 344 is again incremented by one and basic block $B4_2$ is fetched by Core 1 with ticket register value 8. All of the instructions from the basic block $B3_1$ are now committed, so the serving register 344 is incremented by one. Thus, the in-order fetch and commit handles speculative execution and precise exception through the shared ticket lock mechanism utilizing the ticket register 342 and the serving register 344.

Figure 12:
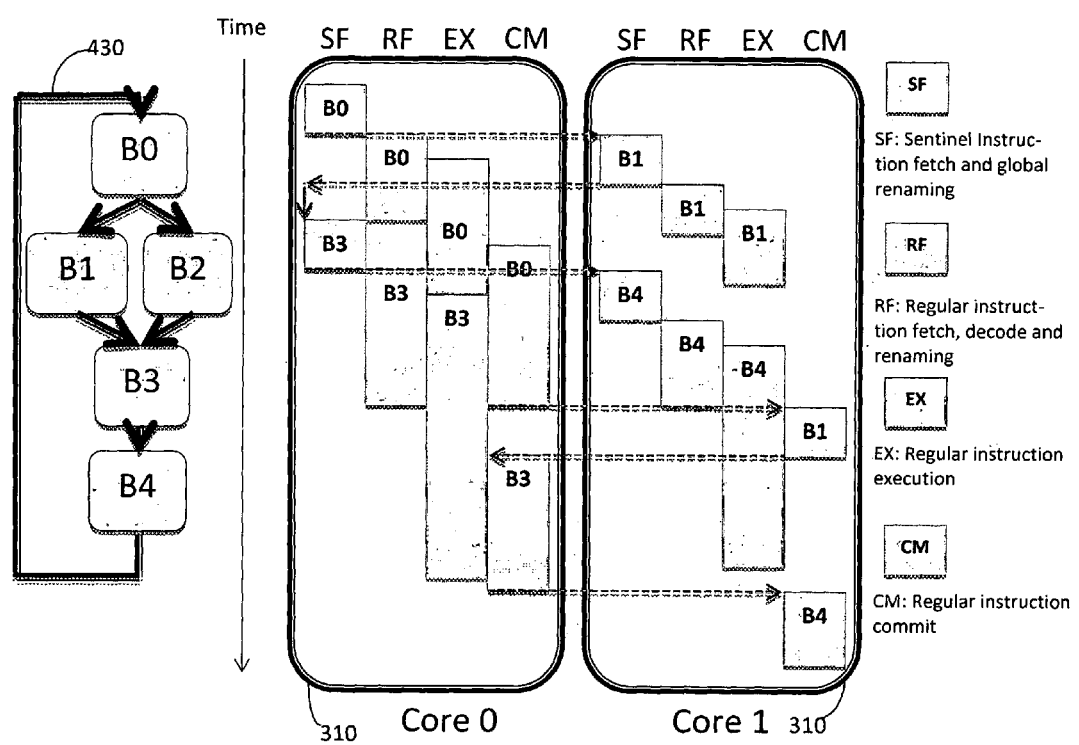
FIG. 12 pictorially depicts a parallel basic block processing operation by the processor architecture of FIG. 3 highlighting fetch, decode, renaming, execution and commit operations for basic block processing in accordance with the present embodiment.

FIG. 12 illustrates the architecture 300 and its operation with an example. As before, the left hand side of the figure shows a simple control flow graph (CFG) 430 corresponding to a program. The CFG 430 contains the five basic blocks B0-B4. In the beginning, the global program counter (GPC) 342 points to the sentinel instruction 500 of basic block B0. Core 0 gets initial lock on the GPC 342, fetches the sentinel instruction 500 of the basic block B0, and renames the global registers according to live-in and live-out information of the sentinel instruction 500 of the basic block B0. The sentinel instruction 500 also indicates that the basic block B0 ends in a branch instruction. Therefore Core 0 performs branch prediction, which indicates B1 as the predicted next basic block 420. So the GPC 342 is updated to point to the sentinel instruction 500 of basic block B1 and Core 0 releases its lock on the GPC 342. During this period Core 1 is sitting idle as it cannot obtain a lock on the GPC 342.

Now Core 0 starts fetching, decoding, renaming, and executing the regular instructions from basic block B0. Meanwhile, as the GPC 342 has been released, Core 1 locks the GPC 342 and renames global registers corresponding to basic block B1. As B1 does not have any branch instruction at the end, the GPC 342 is incremented by the length of B1 and now points to B3. Core 1 also releases the lock on the GPC 342. At this point, both Core 0 and Core 1 are fetching, renaming, and executing instructions from their corresponding basic blocks 420.

When Core 1 releases the lock on the GPC 342, both the cores 310 are still busy fetching instructions from their respective basic blocks 420. Therefore, none of them attempt to lock the GPC 342. Only when a core 310 completes fetching all the instructions from its current basic block 420, will it proceed to get the lock on the GPC 342 for the next basic block 310. This is the reason why there is a gap between the completion of the execution of the sentinel instruction 500 in B1 and the fetching of the sentinel instruction 500 in B3.

Next, Core 0 completes fetching all the instructions of B0 and locks the GPC 342 for B3. So when Core 1 completes fetching all its instructions from basic block B1, it needs to wait for the lock. Even though in this example the basic blocks alternate between the two cores, it is possible for a core 310 to fetch consecutive basic blocks (as seen in FIGS. 10 and 11) especially when the other core 310 is handling a large basic block 420 and cannot request lock on the GPC 342.

Turning now to the commit, initially the value of the serving and ticket registers 346, 344 are both 0. Thus Core 0 tags all the instructions of B0 with "0" and the ticket register 344 is incremented to 1. Once the first instruction of B0 completes execution, Core 0 can start committing instructions as the value of the serving register 346 matches the tag of its instructions. Core 1 has tagged all the instructions of B1 with the ticket value 1. So, Core 1 cannot commit in parallel with Core 0. Instead, it should wait till Core 0 completes all the commit and increments the serving register 346 to 1. This introduces idle cycles in the commit stage of Core 1 as shown in FIG. 12.

When a core 310 detects a branch misprediction, it will signal all the cores 310 (including itself) to flush the fetch queues and the ROB entries with ticket values greater than the ticket value of the mispredicted branch instruction. In other words, all the instructions subsequent to the mispredicted branch are flushed from the pipeline similar to what happens in a normal out-of-order execution. The core 310 will ask any other core 310 locking the GPC 342 to release it. The core 310 with the mispredicted branch will then lock the GPC 342, restore the global ticket register 344 to one plus the ticket value of the mispredicted branch instruction and set the GPC 342 to the correct address. Then it will continue fetching from the new GPC address which now points to the correct sentinel instruction. The same policy is followed to maintain precise exception.

As with any out-of-order architecture, operation in accordance with the present embodiment restricts the store operations to update the memory in the commit stage. Thus, write-after-write memory hazards can be avoided. However, the problems of write-after-read and read-after-write memory hazards still exist. A load and store executing on different cores 310 can access the same memory location. In that case, operation in accordance with the present embodiment ensures that they execute in the original program order. If a load instruction is about to read from an address at which a previous store (from another core 310) has to write, then the load operation may read a wrong value.

This problem is not unique. Even in a single-core traditional out-of-order execution engine, a load may execute while the memory address of a previous store instruction is still not ready. Later on, it may turn out that the load and the previous store access the same address and hence the value read by the load operation is incorrect. This is handled through memory disambiguation at commit stage by out-of-order processors and operation in accordance with the present embodiment utilizes the same mechanism. This mechanism enforces that all load operations should execute two times. First, when their operands are ready (execution stage) and second, when they are ready to commit. When the load is executed the second time, it will check if the value read is different from the value which was obtained at the first attempt. If it is different, then it means that another core 310 has committed previously and it wrote at the same address. All the instructions executed after the load instruction by all the cores 310 (including the current one) are corrupted and the core 310 will have to signal all the cores to flush their internal structures and again prepare the GPC 342 and the ticket registers 344 for a new fetch.

In summary, the multi-core processor architecture and its operation in accordance with the present embodiment requires (a) in-order fetching of the sentinel instructions 500 so that global register renaming can happen in-order, and (b) in-order commit of the instructions across the cores 310. The dashed lines in FIG. 12 highlight the in-order fetch and commit operations. They can introduce idle cycles but are necessary to maintain correctness of program execution. The fetch, rename, and execute of regular instructions in the cores 310 can proceed in parallel to create the illusion of a single virtual out-of-order engine.

Figure 13A:
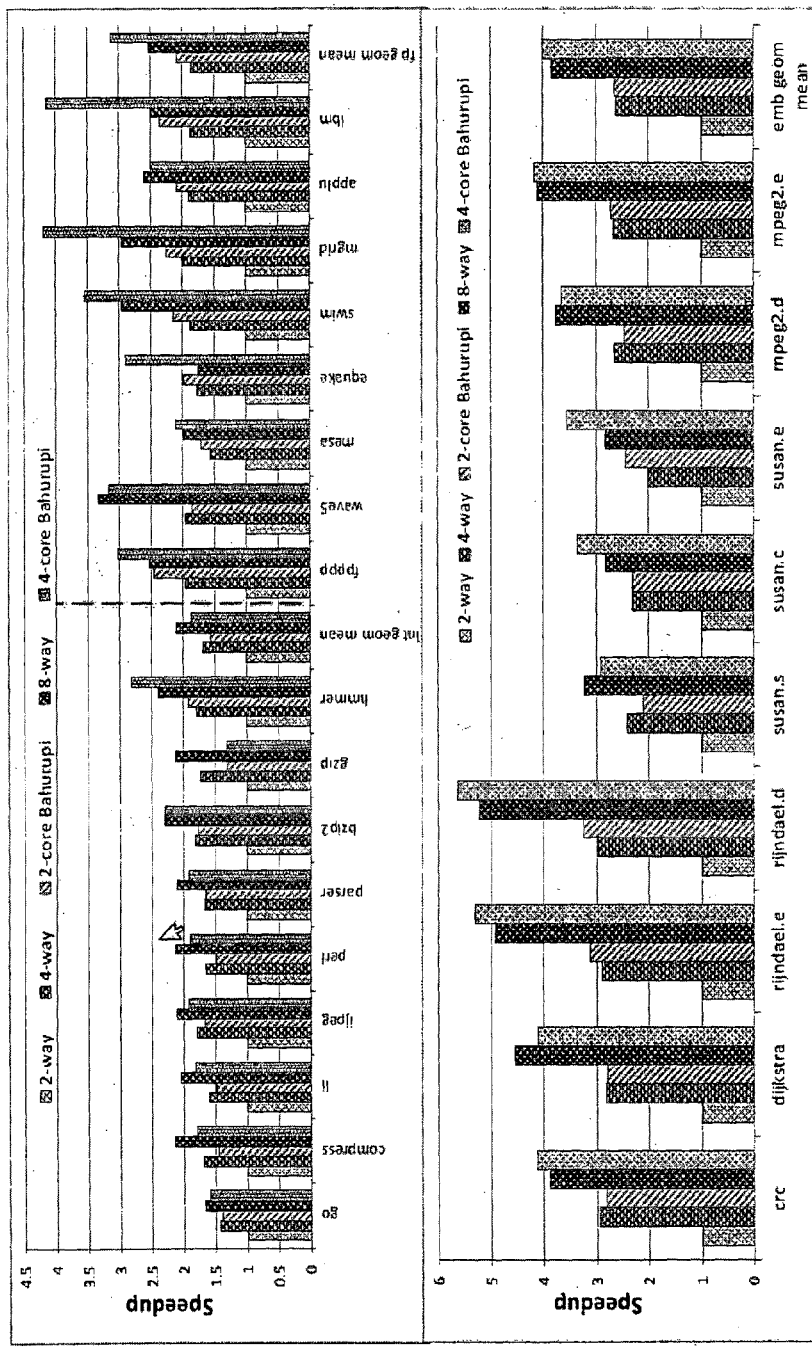
FIGS. 13A and 13B, are bar graphs depicting the speedup and energy consumption improvements of the operation of the processor architecture of FIG. 3 (referred to as Bahurupi in the graph legends, where Bahurupi is an Indian word meaning a person of many forms and guides, a polymorph) normalized to two-way cores as compared to conventional SPEC and embedded benchmarks.
Figure 13B:
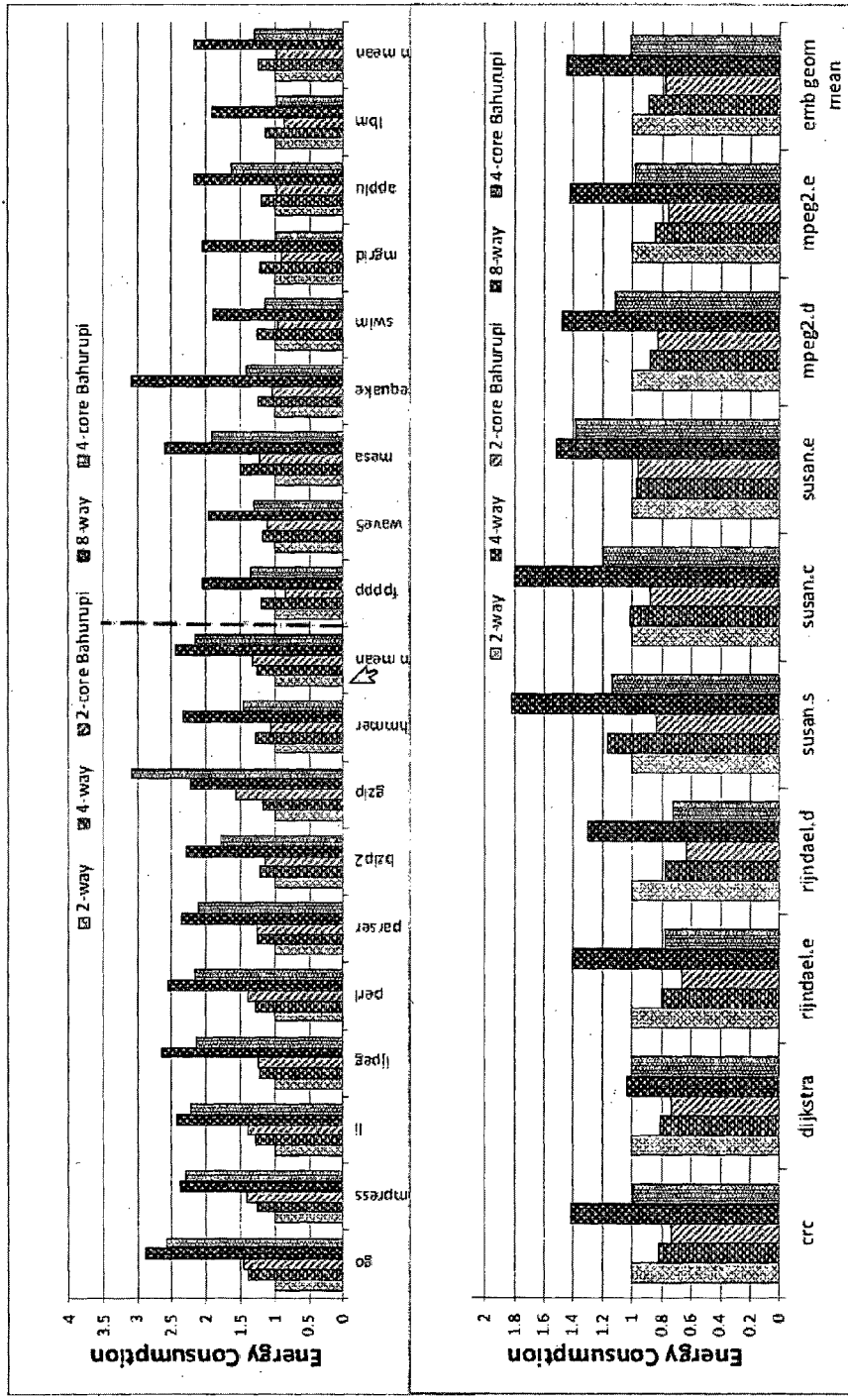

Referring to FIG. 13, the multi-core processor architecture and its operation in accordance with the present embodiment (termed the Bahurupi model, where Bahurupi is an Indian word meaning a person of many forms and guides, a polymorph) of execution can even outperform true out-of-order execution engines. For example, for floating point benchmarks, 2-core architecture in accordance with the present embodiment performs better than a 4-way issue out-of-order processor in both speed-up and energy consumption (see FIGS. 13A and 13B). This is because processing in accordance with the present embodiment can look far ahead in the future. In FIG. 12, for example, the cores 310 are fetching instructions from basic blocks B3 and B4 in parallel. In the 4-way issue processor, however, the instructions from B3 and B4 have to be fetched sequentially. As dependencies between the basic blocks 420 are resolved with the help of live-in, live-out information, processing in accordance with the present embodiment can exploit ILP across basic blocks much more easily.

Referring specifically to FIG. 13B, the bar graphs plot energy consumption of Bahurupi normalized with respect to the baseline 2-way core. As expected, for SPEC integer benchmarks, 2-core Bahurupi consumes 5% more energy compared to 4-way baseline cores due to slightly increased execution time and the extra energy consumption due to coalition logic and sentinel instructions. But 4-core Bahurupi improves energy consumption by 29% compared to 8-way baseline architecture. For SPEC floating point and embedded benchmarks, on an average, 2-core Bahurupi improves the energy consumption by 26% and 11%, respectively, compared to 4-way cores. This is due to the reduced power per core and the overall improved execution time The present embodiment provides an advantageous reconfigurable heterogeneous architecture. At runtime, it is possible to form a coalition of two to four cores 310 if needed for execution of higher ILP applications. On the other hand, the architecture behaves like a traditional homogeneous multi-core architecture in non-coalition mode. The reconfiguration overhead of Bahurupi is minimal except for the latency to flush the pipeline. A special instruction is used to request a core to join a coalition or leave from the coalition. In coalition mode, the additional coalition logic is simply turned off. When forming or leaving coalition, the L1 cache memories 313, 315 have to be reconfigured to either run in partitioned mode (for individual cores) or shared mode (for coalition cores). We assume one hundred cycle latency for reconfiguration. Any optimizing compiler computes the live-in and live-out information for a basic block 420 and the compiler in accordance with the present embodiment also inserts the sentinel instruction 500 at the beginning of each basic block 420 as well as split a basic block if it exceeds the threshold for either number of instructions or number of live-in/live-out registers.

Thus, it can be seen that a plurality of simple cores in a reconfigurable multi-core architecture have been provided that can dynamically adapt themselves to support both multi-threaded code with explicit thread-level parallelism as well as sequential code with instruction-level parallelism. In addition, we have disclosed an architecture which provides advantageous operational parameters through the coalition of simple 2-way cores and can perform equal to and sometimes better than 4-way or 8-way superscalar cores. The present embodiment provides a reconfigurable heterogeneous polymorphic multi-core architecture that can be configured at runtime to best match the workload by dynamically adapting itself to support both multi-threaded code with explicit thread-level parallelism as well as sequential code with instruction-level parallelism. It further provides a hardware-software cooperative solution that requires minimal additional hardware resources and compiler support for coalition. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A method for dynamic heterogeneous polymorphic processing in a processor comprising a plurality of processing cores, each of the plurality of processing cores assigned to one of a plurality of core clusters and each of the plurality of core clusters dynamically forming a coalition comprising two or more processing cores of the plurality of processing cores, the method comprising the steps of:
   receiving a processing task comprising a plurality of serial threads;
   dividing each of the plurality of serial threads into a plurality of basic blocks, each of the plurality of basic blocks comprising a single entry point and a single exit point;
   creating a control flow for the plurality of basic blocks;
   determining whether each of the plurality of serial threads requires more than one processing core;
   sending a go-into-coalition-mode-now instruction to ones of the plurality of core clusters for handling ones of the plurality of serial threads that require more than one processing core;
   adding one of a plurality of sentinel instructions to each of the plurality of basic blocks of the ones of the plurality of serial threads that require more than one processing core, each of the plurality of sentinel instructions comprising information for processing of the plurality of basic blocks; and
   upon execution completion of each of the ones of the plurality of serial threads that requires more than one processing core, sending a go-out-of-coalition-mode-now instruction to corresponding ones of the plurality of core clusters.

2. The method in accordance with claim 1 wherein the determining step comprises determining whether each of the plurality of serial threads requires more than one processing core in response to complexity of instruction-level parallelism of each of the plurality of serial threads.

3. The method in accordance with claim 2 wherein the determining step comprises determining that one of the plurality of serial threads requires only one processing core in response to determining that the one of the plurality of serial threads comprises a low instruction level parallelism serial thread.

4. The method in accordance with claim 2 wherein the determining step comprises determining that one of the plurality of serial threads requires a coalition of two processing cores in response to determining that the one of the plurality of serial threads comprises a medium instruction level parallelism serial thread.

5. The method in accordance with claim 2 wherein the determining step comprises determining that one of the plurality of serial threads requires a coalition of four processing cores in response to determining that the one of the plurality of serial threads comprises a high instruction level parallelism serial thread.

6. The method in accordance with claim 1 wherein each of the plurality of sentinel instructions comprises end-with-branch data.

7. The method in accordance with claim 1 wherein each of the plurality of sentinel instructions comprises length of basic block data.

8. A dynamic heterogeneous polymorphic processor comprising:
   a plurality of processing cores, each of the plurality of processing cores assigned to one of a plurality of core clusters;
   one or more coalition logic associated with each of the plurality of core clusters for enabling dynamic heterogeneous polymorphic processing by a coalition of two or more of the plurality of processing cores within the associated one of the plurality of core clusters, each of the one or more coalition logic switching the two or more of the plurality of processing cores into a coalition in response to the one of the plurality of core clusters receiving a coalition request command; and
   cluster input control logic associated with each of the plurality of core clusters, the cluster input control logic receiving a processing task comprising a plurality of serial threads, dividing each of the plurality of serial threads into a plurality of basic blocks wherein each of the plurality of basic blocks comprises a single entry point and a single exit point, and creating a control flow graph for the plurality of basic blocks,
   wherein the cluster input control logic associated with each of the plurality of core clusters further determines whether processing of each of the plurality of serial threads requires one processing core or a coalition of processing cores in response to complexity of instruction-level parallelism of each of the plurality of serial threads,
   wherein the cluster input control logic determines that processing of one of the plurality of serial threads requires two processing cores in response to determining that the one of the plurality of serial threads comprises a medium instruction level parallelism serial thread, the cluster input control logic sending a go-into-coalition-mode-now instruction to the associated one of the plurality of core clusters for the associated one of the plurality of core clusters to form a coalition of two of the plurality of processing cores of the associated one of the plurality of core clusters and passing the one of the plurality of serial threads to coalition logic associated with the coalition.

9. The dynamic heterogeneous polymorphic processor in accordance with claim 8 wherein the cluster input control logic determines that processing of one of the plurality of serial threads requires one processing core in response to determining that the one of the plurality of serial threads comprises a low instruction level parallelism serial thread, the cluster input control logic passing the one of the plurality of serial threads to one of the plurality of processing cores in the associated one of the plurality of core clusters.

10. The dynamic heterogeneous polymorphic processor in accordance with claim 8 wherein the cluster input control logic determines that processing of one of the plurality of serial threads requires four processing cores in response to determining that the one of the plurality of serial threads comprises a high instruction level parallelism serial thread, the cluster input control logic sending a go-into-coalition-mode-now instruction to the associated one of the plurality of core clusters for the associated one of the plurality of core clusters to form a coalition of four of the plurality of processing cores of the associated one of the plurality of core clusters and passing the one of the plurality of serial threads to coalition logic associated with the coalition.

11. A dynamic heterogeneous polymorphic processor comprising:
a plurality of processing cores, each of the plurality of processing cores assigned to one of a plurality of core clusters;
one or more coalition logic associated with each of the plurality of core clusters for enabling dynamic heterogeneous polymorphic processing by a coalition of two or more of the plurality of processing cores within the associated one of the plurality of core clusters, each of the one or more coalition logic switching the two or more of the plurality of processing cores into a coalition in response to the one of the plurality of core clusters receiving a coalition request command; and
cluster input control logic associated with each of the plurality of core clusters, the cluster input control logic receiving a processing task comprising a plurality of serial threads, dividing each of the plurality of serial threads into a plurality of basic blocks wherein each of the plurality of basic blocks comprises a single entry point and a single exit point, and creating a control flow graph for the plurality of basic blocks, and
wherein the cluster input control logic associated with each of the plurality of core clusters further determines whether processing of each of the plurality of serial threads requires one processing core or a coalition of processing cores in response to complexity of instruction-level parallelism of each of the plurality of serial threads,
wherein the cluster input control logic determines that processing of one of the plurality of serial threads requires four processing cores in response to determining that the one of the plurality of serial threads comprises a high instruction level parallelism serial thread, the cluster input control logic sending a go-into-coalition-mode-now instruction to the associated one of the plurality of core clusters for the associated one of the plurality of core clusters to form a coalition of four of the plurality of processing cores of the associated one of the plurality of core clusters and passing the one of the plurality of serial threads to coalition logic associated with the coalition.

12. A dynamic heterogeneous polymorphic processor comprising:
a plurality of processing cores, each of the plurality of processing cores assigned to one of a plurality of core clusters;
one or more coalition logic associated with each of the plurality of core clusters for enabling dynamic heterogeneous polymorphic processing by a coalition of two or more of the plurality of processing cores within the associated one of the plurality of core clusters, each of the one or more coalition logic switching the two or more of the plurality of processing cores into a coalition in response to the one of the plurality of core clusters receiving a coalition request command; and
cluster input control logic associated with each of the plurality of core clusters, the cluster input control logic receiving a processing task comprising a plurality of serial threads, dividing each of the plurality of serial threads into a plurality of basic blocks wherein each of the plurality of basic blocks comprises a single entry point and a single exit point, and creating a control flow graph for the plurality of basic blocks,
wherein the cluster input control logic further adds one of a plurality of sentinel instructions to each of the plurality of basic blocks of ones of the plurality of serial threads that require more than one processing core, each of the plurality of sentinel instructions comprising information for processing of the plurality of basic blocks.

13. The dynamic heterogeneous polymorphic processor in accordance with claim 12 wherein each of the plurality of sentinel instructions comprises end-with-branch data, length of basic block data, live-in registers and live-out registers.

14. The dynamic heterogeneous polymorphic processor in accordance with claim 13 wherein each of the plurality of sentinel instructions comprises three or less live-in registers and three or less live-out registers.

* * * * *